US009105382B2

(12) United States Patent
Heikkila et al.

(10) Patent No.: US 9,105,382 B2
(45) Date of Patent: Aug. 11, 2015

(54) MAGNETIC COMPOSITE

(71) Applicant: Tundra Composites, LLC, White Bear Lake, MN (US)

(72) Inventors: Kurt E. Heikkila, Marine on the St. Croix, MN (US); Rodney K. Williams, Stacy, MN (US); John S. Kroll, Blaine, MN (US)

(73) Assignee: TUNDRA COMPOSITES, LLC, White Bear Lake, MN (US)

( * ) Notice: Subject to any disclaimer, the term of this patent is extended or adjusted under 35 U.S.C. 154(b) by 183 days.

(21) Appl. No.: 13/746,045

(22) Filed: Jan. 21, 2013

(65) Prior Publication Data

US 2013/0130026 A1  May 23, 2013

Related U.S. Application Data

(63) Continuation-in-part of application No. 12/769,500, filed on Apr. 28, 2010, and a continuation-in-part of application No. 12/769,509, filed on Apr. 28, 2010, and a continuation-in-part of application No. 10/988,214, filed on Nov. 12, 2004.

(60) Provisional application No. 61/173,791, filed on Apr. 29, 2009, provisional application No. 60/520,507, filed on Nov. 14, 2003, provisional application No. 60/571,060, filed on May 14, 2004.

(51) Int. Cl.
| | | |
|---|---|---|
| C08K 9/04 | (2006.01) | |
| H01F 1/01 | (2006.01) | |
| B60C 1/00 | (2006.01) | |
| C08K 3/22 | (2006.01) | |
| C08K 7/28 | (2006.01) | |

(52) U.S. Cl.
CPC .. H01F 1/01 (2013.01); B60C 1/00 (2013.01); C08K 3/22 (2013.01); C08K 7/28 (2013.01); C08K 9/04 (2013.01); C08K 2201/01 (2013.01); Y10T 428/28 (2015.01)

(58) Field of Classification Search
USPC .................................................. 523/212, 223
See application file for complete search history.

(56) References Cited

U.S. PATENT DOCUMENTS

| | | | |
|---|---|---|---|
| 2,429,032 A | 10/1947 | Sheahan | |
| 2,723,238 A | 11/1955 | Simpkiss | |
| 2,723,239 A | 11/1955 | Harvey | |
| 2,748,099 A | 5/1956 | Bruner et al. | |
| 2,847,395 A | 8/1958 | Wear | |
| 2,879,667 A | 3/1959 | Henderson | |
| 2,909,060 A | 10/1959 | Branick | |
| 2,958,165 A | 11/1960 | Hofmann | |
| 2,968,649 A | 1/1961 | Pailthorp et al. | |
| 2,995,788 A | 8/1961 | Sunday | |
| 3,002,388 A | 10/1961 | Bageman | |
| 3,137,045 A | 6/1964 | Sunday | |
| 3,177,039 A | 4/1965 | Skidmore | |
| 3,178,399 A | 4/1965 | Lo | |
| 3,289,483 A | 12/1966 | Slemmons | |
| 3,326,051 A | 6/1967 | Bageman | |
| 3,365,315 A | 1/1968 | Beck | |
| 3,379,057 A | 4/1968 | Hegenbart | |
| 3,382,908 A | 5/1968 | Palmquist et al. | |
| 3,424,127 A | 1/1969 | Johnson et al. | |
| 3,452,799 A | 7/1969 | Hindin et al. | |
| 3,474,677 A | 10/1969 | Roe | |
| 3,478,603 A | 11/1969 | Bonessa | |
| 3,493,257 A | 2/1970 | Fitzgerald et al. | |
| 3,616,126 A | 10/1971 | Tungseth | |
| 3,616,127 A | 10/1971 | Guenther | |
| 3,619,456 A | 11/1971 | Taylor | |
| 3,623,208 A | 11/1971 | Hofmann | |
| 3,663,328 A | 5/1972 | Turoczi, Jr. | |
| 3,669,500 A | 6/1972 | Ende | |
| 3,688,380 A | 9/1972 | Hofmann | |
| 3,716,927 A | 2/1973 | Carter | |
| 3,740,257 A | 6/1973 | Roscher | |
| 3,741,016 A | 6/1973 | Hofmann | |
| 3,748,910 A | 7/1973 | Hofmann | |
| 3,786,850 A | 1/1974 | Turoczi, Jr. | |
| 3,793,656 A | 2/1974 | Carter et al. | |
| 3,843,591 A | 10/1974 | Hedrick et al. | |
| 3,894,169 A | 7/1975 | Miller | |
| 3,895,143 A | 7/1975 | Tarlow | |
| 3,901,845 A | 8/1975 | Newbould | |
| 3,905,648 A | 9/1975 | Skidmore | |

(Continued)

FOREIGN PATENT DOCUMENTS

| | | |
|---|---|---|
| CA | 1043393 | 11/1978 |
| CN | 1742045 A | 3/2006 |

(Continued)

OTHER PUBLICATIONS

Dyneon Flouroplastics Product Comparison Guide, Dyneon LLC (A 3M Company), Jun. 2003, 10 pages.
Dow Corning, A Guide to Silane Solutions, Dow Corning Corporation www.dowcorning.com, 2005, 1-30.
Dyneon THV Fluorothermoplastics Injection Molding Guidelines, Dyneon a 3M Company, Apr. 2001, 2 pgs.
Wypych, G. , Handbook of Fillers, 2nd edition, published by Chem Tec Publishing Co-published by Plastics Design Library, Toronto-New York.; The Effect of Fillers on the mechanical properties of filled materials,1999, 3 pages.
Kroschwitz, Plastics, Concise Encyclopedia of Polymer Science and Engineering. (pp. 186-189), John Wiley & Sons (1990). John Wiley & Sons 1990 6 pages.

(Continued)

*Primary Examiner* — Edward Cain
(74) *Attorney, Agent, or Firm* — Pauly, DeVries Smith & Deffner, LLC

(57) ABSTRACT

The invention relates to a polymer composite having magnetic properties that are enhanced or increased in the composite. Such properties include color, thermal conductivity, electrical conductivity, density, improved malleability and ductility viscoelastic and thermoplastic or injection molding properties.

26 Claims, 1 Drawing Sheet

(56) References Cited

U.S. PATENT DOCUMENTS

| | | |
|---|---|---|
| 3,918,141 A | 11/1975 | Pepper |
| 3,953,566 A | 4/1976 | Gore |
| 3,960,409 A | 6/1976 | Songer |
| 4,022,748 A | 5/1977 | Schlichting et al. |
| 4,040,760 A | 8/1977 | Wyckoff |
| 4,111,893 A | 9/1978 | Gasman et al. |
| 4,157,325 A | 6/1979 | Charles et al. |
| 4,168,259 A | 9/1979 | Coleman |
| 4,169,185 A | 9/1979 | Bhatia |
| 4,173,930 A | 11/1979 | Faires et al. |
| 4,178,277 A | 12/1979 | Gebauer et al. |
| 4,187,390 A | 2/1980 | Gore |
| 4,224,267 A | 9/1980 | Lugosi et al. |
| 4,232,979 A | 11/1980 | Johnson et al. |
| 4,257,699 A | 3/1981 | Lentz |
| 4,335,180 A | 6/1982 | Traut |
| 4,340,319 A | 7/1982 | Johnson, Jr. et al. |
| 4,418,186 A | 11/1983 | Yamabe et al. |
| 4,569,978 A | 2/1986 | Barber |
| 4,598,001 A | 7/1986 | Watanabe et al. |
| 4,614,629 A | 9/1986 | Economy |
| 4,740,538 A | 4/1988 | Sekutowski |
| 4,780,981 A | 11/1988 | Hayward et al. |
| 4,793,616 A | 12/1988 | Fernandez |
| 4,886,689 A | 12/1989 | Kotliar et al. |
| 4,891,399 A | 1/1990 | Ohkawa et al. |
| 4,949,645 A | 8/1990 | Hayward |
| 5,017,432 A | 5/1991 | Eddy et al. |
| 5,019,311 A | 5/1991 | Koslow |
| 5,026,748 A | 6/1991 | Adams et al. |
| 5,061,965 A | 10/1991 | Ferguson et al. |
| 5,073,320 A | 12/1991 | Sterzel |
| 5,073,444 A | 12/1991 | Shanelec |
| 5,126,192 A | 6/1992 | Chellis et al. |
| 5,130,342 A | 7/1992 | McAllister et al. |
| 5,141,273 A | 8/1992 | Freeman |
| 5,147,722 A | 9/1992 | Koslow |
| 5,198,295 A | 3/1993 | Arthur et al. |
| 5,210,113 A | 5/1993 | Waters |
| 5,214,088 A | 5/1993 | Allen et al. |
| 5,214,106 A | 5/1993 | Carlson et al. |
| 5,237,930 A | 8/1993 | Belanger et al. |
| 5,265,925 A | 11/1993 | Cox et al. |
| 5,278,219 A | 1/1994 | Lilley et al. |
| 5,286,802 A | 2/1994 | Uesugi et al. |
| 5,289,997 A | 3/1994 | Harris |
| 5,342,573 A | 8/1994 | Amano et al. |
| 5,354,611 A | 10/1994 | Arthur et al. |
| 5,373,047 A | 12/1994 | Schnelle et al. |
| 5,378,407 A | 1/1995 | Chandler et al. |
| 5,384,345 A | 1/1995 | Naton |
| 5,399,187 A | 3/1995 | Mravic et al. |
| 5,418,293 A | 5/1995 | Numa et al. |
| 5,506,049 A | 4/1996 | Swei et al. |
| 5,548,125 A | 8/1996 | Sandbank |
| 5,591,279 A | 1/1997 | Midorikawa et al. |
| 5,594,186 A | 1/1997 | Krause et al. |
| 5,616,642 A | 4/1997 | West et al. |
| 5,620,775 A | 4/1997 | LaPerre |
| 5,631,053 A | 5/1997 | Andersen et al. |
| 5,639,838 A | 6/1997 | Albano et al. |
| 5,660,903 A | 8/1997 | Andersen et al. |
| 5,674,930 A | 10/1997 | Sugiura |
| 5,674,931 A | 10/1997 | Gallagher et al. |
| 5,696,216 A | 12/1997 | Kruger et al. |
| 5,705,242 A | 1/1998 | Andersen et al. |
| 5,712,003 A | 1/1998 | Suenaga et al. |
| 5,786,416 A | 7/1998 | Gardner et al. |
| 5,866,647 A | 2/1999 | Massey et al. |
| 5,877,437 A | 3/1999 | Oltrogge |
| 5,922,453 A | 7/1999 | Horn, III et al. |
| 5,959,205 A | 9/1999 | Yamaya et al. |
| 6,048,379 A | 4/2000 | Bray et al. |
| 6,074,576 A | 6/2000 | Zhao et al. |
| 6,090,313 A | 7/2000 | Zhao |
| 6,128,952 A | 10/2000 | LeBlanc |
| 6,168,226 B1 | 1/2001 | Wycech |
| 6,177,533 B1 | 1/2001 | Woodward |
| 6,180,037 B1 | 1/2001 | Andersen et al. |
| 6,196,863 B1 | 3/2001 | Schwant |
| 6,204,303 B1 | 3/2001 | Osuna et al. |
| 6,204,971 B1 | 3/2001 | Morris et al. |
| 6,217,413 B1 | 4/2001 | Christianson |
| 6,270,549 B1 | 8/2001 | Amick |
| 6,308,999 B1 | 10/2001 | Tan et al. |
| 6,318,775 B1 | 11/2001 | Heatherington et al. |
| 6,346,565 B1 | 2/2002 | Daifuku et al. |
| 6,364,421 B1 | 4/2002 | Pursley |
| 6,364,422 B1 | 4/2002 | Sakaki et al. |
| 6,371,532 B1 | 4/2002 | Skarie et al. |
| 6,406,078 B1 | 6/2002 | Wycech |
| 6,411,248 B1 | 6/2002 | Barbour et al. |
| 6,413,626 B1 | 7/2002 | Wollner |
| 6,457,417 B1 | 10/2002 | Beal |
| 6,482,519 B1 | 11/2002 | Schleifstein et al. |
| 6,514,595 B1 | 2/2003 | Sprouts |
| 6,515,066 B2 | 2/2003 | Allen et al. |
| 6,517,774 B1 | 2/2003 | Bray et al. |
| 6,525,125 B1 | 2/2003 | Giardello et al. |
| 6,553,831 B1 | 4/2003 | Schmidt et al. |
| 6,562,290 B2 | 5/2003 | Meinhardt et al. |
| 6,576,697 B1 | 6/2003 | Brown et al. |
| 6,578,431 B2 | 6/2003 | Dillard et al. |
| 6,623,849 B2 | 9/2003 | Meguro et al. |
| 6,672,635 B2 | 1/2004 | Weissenborn et al. |
| 6,695,366 B2 | 2/2004 | Cherry |
| 6,727,339 B2 | 4/2004 | Luginsland et al. |
| 6,732,807 B2 | 5/2004 | Poynton |
| 6,740,260 B2 | 5/2004 | McCord |
| 6,815,066 B2 | 11/2004 | Elliott |
| 6,815,484 B2 | 11/2004 | Scholl et al. |
| 6,849,338 B2 | 2/2005 | Clemens et al. |
| 6,866,313 B2 | 3/2005 | Mooijman et al. |
| 6,884,844 B2 | 4/2005 | Hamilton et al. |
| 6,913,863 B2 | 7/2005 | Wu et al. |
| 6,916,354 B2 | 7/2005 | Elliott |
| 6,916,863 B2 | 7/2005 | Hemmings et al. |
| 6,960,626 B2 | 11/2005 | Takekoshi et al. |
| 6,962,181 B2 | 11/2005 | Deevers et al. |
| 6,972,144 B2 | 12/2005 | Roth et al. |
| 6,981,996 B2 | 1/2006 | Shaner et al. |
| 6,983,964 B2 | 1/2006 | Murata et al. |
| 6,994,925 B2 | 2/2006 | Masaki |
| 7,007,990 B2 | 3/2006 | Van Damme et al. |
| 7,015,271 B2 | 3/2006 | Bice et al. |
| 7,037,865 B1 | 5/2006 | Kimberly |
| 7,069,990 B1 | 7/2006 | Bilak |
| 7,083,695 B2 | 8/2006 | Vannan et al. |
| 7,086,690 B2 | 8/2006 | Shuler et al. |
| 7,121,955 B2 | 10/2006 | Stevens et al. |
| 7,164,197 B2 | 1/2007 | Mao et al. |
| 7,169,489 B2 | 1/2007 | Redmond |
| 7,176,269 B2 | 2/2007 | Hakuta et al. |
| 7,204,191 B2 | 4/2007 | Wiley et al. |
| 7,213,519 B2 | 5/2007 | Wiley et al. |
| 7,216,938 B2 | 5/2007 | Phillips |
| 7,217,389 B2 | 5/2007 | Amick |
| 7,230,044 B2 | 6/2007 | Takekoshi et al. |
| 7,232,473 B2 | 6/2007 | Elliott |
| 7,249,804 B2 | 7/2007 | Zank et al. |
| 7,324,261 B2 | 1/2008 | Tonar et al. |
| 7,354,968 B2 | 4/2008 | Nishikawa et al. |
| 7,356,390 B2 | 4/2008 | Knoblach et al. |
| 7,370,893 B2 | 5/2008 | Tamada et al. |
| 7,406,990 B2 | 8/2008 | Brown et al. |
| 7,449,224 B2 | 11/2008 | Ensinger |
| 7,478,849 B2 | 1/2009 | Fortin |
| 7,491,356 B2 | 2/2009 | Heikkila |
| 7,507,480 B2 | 3/2009 | Sugama |
| 7,511,102 B2 | 3/2009 | Hasegawa et al. |
| 7,524,910 B2 | 4/2009 | Jiang et al. |
| 7,528,189 B2 | 5/2009 | Taylor et al. |
| 7,531,583 B2 | 5/2009 | Desai |
| 7,533,912 B2 | 5/2009 | Frederick et al. |

(56) References Cited

U.S. PATENT DOCUMENTS

| | | |
|---|---|---|
| 7,552,955 B2 | 6/2009 | Evans |
| 7,559,348 B2 | 7/2009 | Puhala et al. |
| 7,589,284 B2 | 9/2009 | Severance et al. |
| 7,612,929 B2 | 11/2009 | Tonar et al. |
| 7,622,529 B2 | 11/2009 | Walton et al. |
| 7,628,971 B2 | 12/2009 | Stenzel et al. |
| 7,645,829 B2 | 1/2010 | Tse et al. |
| 7,649,029 B2 | 1/2010 | Kolb et al. |
| 7,666,933 B2 | 2/2010 | Wu |
| 7,671,227 B2 | 3/2010 | Dawes et al. |
| 7,789,117 B2 | 9/2010 | Puhala et al. |
| 7,790,131 B2 | 9/2010 | Stenzel et al. |
| 7,841,669 B2 | 11/2010 | Zank |
| 7,878,599 B2 | 2/2011 | Astorino |
| 7,883,156 B2 | 2/2011 | Pursley et al. |
| 7,906,587 B2 | 3/2011 | Poon et al. |
| 7,954,864 B2 | 6/2011 | Frederick et al. |
| 7,977,432 B2 | 7/2011 | Bening et al. |
| 7,989,068 B2 | 8/2011 | Rao et al. |
| 8,034,443 B2 | 10/2011 | Eder |
| 8,084,537 B2 | 12/2011 | Walton et al. |
| 8,086,611 B2 | 12/2011 | Van Vleck et al. |
| 8,106,105 B2 | 1/2012 | Cernohous |
| 8,181,580 B2 | 5/2012 | Roth et al. |
| 8,210,212 B2 | 7/2012 | Buchner |
| 8,272,412 B2 | 9/2012 | Bergman et al. |
| 8,309,659 B2 | 11/2012 | Masarati et al. |
| 8,316,903 B2 | 11/2012 | Majumdar et al. |
| 8,357,727 B2 | 1/2013 | Strandburg et al. |
| 8,487,034 B2 | 7/2013 | Heikkila et al. |
| 8,841,358 B2 | 9/2014 | Heikkila et al. |
| 2001/0050020 A1 | 12/2001 | Davis et al. |
| 2002/0000275 A1 | 1/2002 | Fogal, Sr. |
| 2002/0079707 A1 | 6/2002 | Skarie et al. |
| 2002/0114940 A1 | 8/2002 | Clemens et al. |
| 2002/0153144 A1 | 10/2002 | Weaver |
| 2002/0198286 A1* | 12/2002 | Igarashi et al. ............... 523/137 |
| 2003/0065070 A1 | 4/2003 | Nishida et al. |
| 2003/0130418 A1 | 7/2003 | Hamilton et al. |
| 2003/0133193 A1 | 7/2003 | Martinez |
| 2003/0143099 A1 | 7/2003 | Amick |
| 2003/0155055 A1 | 8/2003 | Leblanc |
| 2004/0135384 A1 | 7/2004 | Pritchard et al. |
| 2004/0140042 A1 | 7/2004 | Teratani et al. |
| 2004/0220321 A1 | 11/2004 | Bataille et al. |
| 2005/0005807 A1 | 1/2005 | Wiley et al. |
| 2005/0062332 A1 | 3/2005 | Amyot et al. |
| 2005/0153610 A1 | 7/2005 | McCarthy |
| 2005/0188879 A1 | 9/2005 | Wiley et al. |
| 2005/0258404 A1 | 11/2005 | McCord |
| 2006/0016535 A1 | 1/2006 | Mauclin et al. |
| 2006/0020086 A1 | 1/2006 | Smith |
| 2006/0029795 A1 | 2/2006 | Sawyer et al. |
| 2006/0055077 A1 | 3/2006 | Heikkila |
| 2006/0105053 A1 | 5/2006 | Marx et al. |
| 2006/0118211 A1 | 6/2006 | Elliott |
| 2006/0118311 A1 | 6/2006 | Serritella et al. |
| 2006/0137575 A1 | 6/2006 | Stenzel et al. |
| 2007/0005818 A1 | 1/2007 | Tsuruoka et al. |
| 2007/0113759 A1 | 5/2007 | Roth et al. |
| 2007/0207186 A1 | 9/2007 | Scanlon et al. |
| 2007/0236938 A1 | 10/2007 | Ouderkirk et al. |
| 2007/0236939 A1 | 10/2007 | Ouderkirk et al. |
| 2008/0063850 A1 | 3/2008 | Vilchis Ramirez et al. |
| 2008/0069852 A1 | 3/2008 | Shimp et al. |
| 2008/0139722 A1 | 6/2008 | Shefelbine et al. |
| 2008/0139731 A1 | 6/2008 | Lawson et al. |
| 2008/0160302 A1 | 7/2008 | Asrar et al. |
| 2008/0245460 A1 | 10/2008 | Brown et al. |
| 2008/0299990 A1 | 12/2008 | Knoblach et al. |
| 2008/0315453 A1 | 12/2008 | Molitor et al. |
| 2009/0032088 A1 | 2/2009 | Rabinowitz |
| 2009/0068363 A1 | 3/2009 | Smetana |
| 2009/0078353 A1 | 3/2009 | Majumdar et al. |
| 2009/0084042 A1 | 4/2009 | Ramanath et al. |
| 2009/0084482 A1 | 4/2009 | Majumdar et al. |
| 2009/0087661 A1 | 4/2009 | Eder |
| 2009/0127801 A1 | 5/2009 | Heikkila |
| 2009/0127919 A1 | 5/2009 | Burnett |
| 2009/0227792 A1 | 9/2009 | Briehn et al. |
| 2009/0242091 A1 | 10/2009 | Puhala et al. |
| 2009/0254171 A1 | 10/2009 | Heikkila |
| 2009/0255613 A1 | 10/2009 | Zhang et al. |
| 2009/0303593 A1 | 12/2009 | Sagar et al. |
| 2009/0314482 A1 | 12/2009 | Heikkila |
| 2009/0324875 A1 | 12/2009 | Heikkila |
| 2010/0279100 A1 | 11/2010 | Heikkila |
| 2010/0280145 A1 | 11/2010 | Heikkila et al. |
| 2010/0280164 A1 | 11/2010 | Heikkila et al. |
| 2010/0291374 A1 | 11/2010 | Akarsu et al. |
| 2013/0130026 A1 | 5/2013 | Heikkila et al. |
| 2013/0157053 A1 | 6/2013 | Heikkila et al. |
| 2015/0057402 A1 | 2/2015 | Heikkila et al. |

FOREIGN PATENT DOCUMENTS

| | | |
|---|---|---|
| CN | 1902271 A | 1/2007 |
| CN | 101959946 | 1/2011 |
| DE | 130863 | 5/1978 |
| DE | 10254877 | 6/2004 |
| DE | 202006012954 | 11/2006 |
| EP | 0287045 | 10/1988 |
| EP | 0376461 | 7/1990 |
| EP | 1150311 | 10/2001 |
| EP | 1752491 | 2/2007 |
| EP | 1762751 | 3/2007 |
| FR | 1248939 | 10/1960 |
| FR | 1308945 | 12/1961 |
| FR | 1530795 | 6/1967 |
| GB | 827308 | 2/1960 |
| GB | 836316 | 6/1960 |
| GB | 838857 | 6/1960 |
| GB | 911275 | 11/1962 |
| GB | 914753 | 1/1963 |
| GB | 964937 | 7/1964 |
| GB | 974764 | 11/1964 |
| GB | 1246829 | 9/1971 |
| GB | 1259481 | 1/1972 |
| GB | 2179664 | 3/1987 |
| JP | 61501211 | 6/1986 |
| JP | 63273664 | 11/1988 |
| JP | 02022375 | 5/1990 |
| JP | 02219872 | 9/1990 |
| JP | 06226771 | 8/1994 |
| JP | 06328908 | 11/1994 |
| JP | 07258475 | 10/1995 |
| JP | 11172162 | 6/1999 |
| JP | 2000191749 | 7/2000 |
| JP | 2000256569 | 9/2000 |
| JP | 2001015319 | 1/2001 |
| JP | 2001030697 | 2/2001 |
| JP | 2001041290 | 2/2001 |
| JP | 2001110620 | 4/2001 |
| JP | 2001123011 | 5/2001 |
| JP | 2001123067 | 5/2001 |
| JP | 2001183099 | 7/2001 |
| JP | 2001349381 | 12/2001 |
| JP | 2002013592 | 1/2002 |
| JP | 2002257499 | 9/2002 |
| JP | 2007297432 | 11/2007 |
| WO | WO-9305101 | 3/1993 |
| WO | WO-9800462 | 1/1998 |
| WO | WO-02086347 | 10/2002 |
| WO | WO-03029343 | 4/2003 |
| WO | WO-2005012408 | 2/2005 |
| WO | WO-2005049714 | 6/2005 |
| WO | WO-2005049764 | 6/2005 |
| WO | WO-2007094764 | 8/2007 |
| WO | WO-2007134788 | 11/2007 |
| WO | WO-2008022781 | 2/2008 |
| WO | WO-2009091987 | 7/2009 |
| WO | WO-2010127101 | 11/2010 |

(56) References Cited

FOREIGN PATENT DOCUMENTS

| WO | WO-2010127106 | 11/2010 |
|---|---|---|
| WO | WO2010127117 | 11/2010 |

OTHER PUBLICATIONS

3M Flexible Magnet Tape Bendable. Bondable. Adaptable. Dependable, 3M Flexible Magnet Tape for versatile attachment solutions., http://solutions.3m.com/wps/portal/3M/en_US/3M-Industrial/Adhesives/Product/Fasteners/?WT.mc_id=www.3m.com/fasteners, 2 pages (Copyright)
Lai, et al., A Study on the Friction and WEar Behavior of PTFE Filled with Acid Treated Nano-Attapulgite, Macromolecular Materials and Engineering, vol. 289, (7 pages) (2004).
ASTM D3664, Standard Specification, for Biaxially Oriented Polymeric Resin Film for Capacitors in Electrical Equipment, 7 pages, 2009.
Meyers, M et al., Biological Materials: Structure and Mechanical Properties, Progress in Materials Science, vol. 53, No. 1, pp. 1-206, http://www.sciencedirect.com/science?_ob=ArticleURL&_udi=B6TX1-4NS0KM2-1&z_u . . . , (Jan. 2008) (3 page abstract).
Bridging the Gap with Coupling Agents, Article of the Week by SpecialChem, http://www.specialchem4polymers.com/2456/eng/article.aspx?id=1355, (pp. 1-7) (Aug. 25, 2003).
Characterization and Failure Analysis of Plastics, ASM International, (2003) (5 pgs).
First Office Action for Chinese Application No. 200980107697.X, corresponding to U.S. Appl. No. 12/355,203, mailed Nov. 10, 2011, (8 pages) Including English translation.
Communication Pursuant to Article 94(3) EPC, European Examination Report, from the, European Patent Office in EP Patent Application No. 09701577.0, mailed Mar. 28, 2012, (pp. 1-5).
Summerscales, Composites Design and Manufacture (BEng)—Mats 324 Composites Publications, http://www.tech.plym.ac.us/sme/MATS324/Publications.htm (pp. 1-7) (Feb. 17, 2005).
Composite Material, Wikipedia, the free encyclopedia, http://en.wikipedia.org/wiki/Composite_material, pp. 1-5 (Aug. 11, 2008).
Declaration of Rodney Williams, dated Jun. 13, 2013, 7 pages.
DuPont(Tm) Teflon PTFE 6C, fluoropolymer resin, DuPont (May 2005), 2 pages.
Dyneon Fluoroelastomers: Processing Fluoroelastomers, Dyneon a 3M Company. Jan. 2001, 8 pgs.
Dyneon Fluoroplastics Product Comparison Guide, Dyneon a 3M Company. Apr. 26, 2002. 10 pgs.
Dyneon Fluorothermoplastics FEP X 6301, FEP X 6303 and FEP X 6307, Dyneon a 3M Company. Aug. 2001, 2 pgs.
Dyneon Fluorothermoplastics Product Information, Dyneon a 3M Company. Dec. 2000, 2 pgs.
Dyneon Fluorothermoplastics THV 220A, Dyneon a 3M Company. Aug. 2001, 2 pgs.
Dyneon THV 221AZ Ultra Flexible THV in Aggolomerate Form, Dyneon a 3M Company. Mar. 2009, 2 pgs.
Ebnesajjad, Sina and Khaladkar, Pradip, Fluoropolymers,, Applications in Chemical Processing Industries, 16 pages, 2004.
Ecomass Compounds Product Data Sheet: PEM-01-01-110-LTS, PolyOne Corporation. Apr. 26, 2002. 1 pg.
Ecomass Compounds Product Data Sheet: PEM-07-01-090-LTS, PolyOne Corporation. Apr. 26, 2002. 1 pg.
Bose, et al., Effect of Flyash on the Mechanical, Thermal, Dielectric, Rheological and Morphological Properties of Filled Nylon 6, Journal of Minerals & Materials Characterization & Engineering , vol. 3, No. 2., (8 pages) (2004).
Bose, et al., Effect of Particle Size of Filler on Properties of Nylon-6, Journal of Minerals & Materials characterization & Engineering, vol. 3, No. 1, (9 pages) (2004).
Ellis, Bryan and Smith Ray (edited by), Polymers, A Property Database, Second Edition, CRC Press, 2009, 4 pages.
European Search Report, for European Patent Application No. 10 18 2628, dated Nov. 3, 2010, entitled Metal Polymer Composite, a Method for its Extrusion and Shaped Articles Therefrom (9 pages).
European Search Report, for European Patent Application No. 10 18 2673, dated Nov. 3, 2010, entitled Metal Polymer Composite, a Method for its Extrusion and Shaped Articles Made Therefrom (10 pages).
Features Specifications: Non-Metallic Polymer Composite, http://www.alibaba.com/product-gs/207051916/non_metallic_polymer_composite.html, 2 pages (date Printed Aug. 11, 2008).
Final Office Action, for U.S. Appl. No. 12/769,509, mailed Mar. 12, 2013 (27 pages).
Final Office Action, for U.S. Appl. No. 12/769,500, mailed Jul. 17, 2013 (20 pages).
Final Office Action, mailed Oct. 17, 2012 in U.S. Appl. No. 12/769,500, Ceramic Composite, (11 pages).
Final Office Action, mailed Jul. 25, 2012 in U.S. Appl. No. 10/988,214, Enhanced Property Metal Polymer Composite, (18 pages).
Final Office Action, mailed Nov. 2, 2011 in co-pending U.S. Appl. No. 12/276,947, Enhanced Property Metal Polymer Composite, (12 pages).
Final Office Action, mailed Mar. 3, 2011 in co-pending U.S. Appl. No. 10/988,214, Enhanced Property Metal Polymer Composite (14 pages).
Final Office Action, mailed Jun. 6, 2012 in U.S. Appl. No. 12/278,633, Metal Polymer Composite with Enhanced Viscoelastic and Thermal Properties, (18 pages).
Final Office Action Received, mailed Dec. 13, 2011 in co-pending U.S. Appl. No. 12/278,638, Enhanced Property Metal Polymer Composite, (12 Pages).
First Office Action, for China Application No. 201080018728.7, mailed Mar. 21, 2013 (5 pages).
First Office Action, from JP Application No. 2012-508730, mailed Aug. 16, 2013, 5 pages.
First Office Action, from CN Application No. 2010800187291, mailed Dec. 6, 2012, (pp. 1-8) Including English translation.
Formula for Shear, Mar. 5, 2012. 1 pg.
Arkles, Gelest Silane Coupling Agents: Connectiong Across Boundaries, Gelest, Inc., Cover Page, (22 pages), Copyright 2003.
Silane Coupling Agents: Connecting Across Boundaries, Gelest Inc. (2006), 60 pgs.
Depass, Dee , Getting the Lead Out: Alliant's 'Green' Bullet, Star Tribune. Startribune.com. Published Sep. 3, 2003, 3 pgs.
High Performance Innovations: Case Studies, 20 pages (Publicly known at least as early as Nov. 24, 2008).
Bhowmik, et al., Influence of Mineral Polymer Interactions on Molecular Mechanics of Polymer in Composite Bone Biomaterials, Materials Research Society, http://www.mrs.org/s_mrs/sec_subscribe.asp?CID=7637&DID=194200&action=detail, 2 pgs (Date Printed Aug. 11, 2008).
Coleman, M M. et al., Infrared Spectroscopy: Applicatoins to Chemical Systems, vol. 4, Academic Press, Inc., New York, (pp. 469-472), (1978).
International Search Report and Written Opinion, for PCT/US06/04725 mailed Nov. 9, 2006 (14 pages).
International Search Report and Written Opinion, for PCT/US06/04817, mailed Jul. 3, 2008 (8 pages).
International Search Report and Written Opinion, for PCT/US2004/037931, mailed May 25, 2005 (23 pages).
International Search Report and Written Opinion, for PCT/US2010/032950, mailed Sep. 15, 2010 (13 pages).
International Search Report and Written Opinion, for PCT/US2010/032956, mailed Sep. 15, 2010 (13 pages).
International Search Report and Written Opinion, for PCT/US2010/032969, mailed Sep. 24, 2010 (14 pages).
First Office Action for JP Application No. 2010-543277, mailed Nov. 6, 2012, 9 pages Including English translation.
Ken-React Reference Manual: Titanate, Zirconate and Aluminate Coupling Agents, Kenrich Petrochemical, Inc. (1987). 9 pgs.
Lead Free Weight Suppliers, Materials from web sites of suppliers of auto wheel weights, 2 pages (Jul. 2005).
Sawyer, et al., Low Friction and Low Wear Polymer/ Polymer Composites, Abstract No. 20070005854, 2 page abstract (Sep. 9, 2004).
M.C. Gill Corporation—Glossary, Accessed Nov. 22, 2011. 15 pgs.

(56) References Cited

OTHER PUBLICATIONS

Scheirs, John, Modern Fluoropolymers, Book Abstract, 1 page, (1997).
Moldman 8000: Presentation, Moldman Machines Low Pressure Injection Molding Technology. moldmanmachines.com/moldman_8000_presentation.php. Jun. 8, 2012. 1 pg.
Sawyer, W. et al., Multi-Layer Low Friction and Low Lear Polymer/Polymer Composites Having Compositionally Graded Interfaces, Abstract No. 20060029795, 1 page abstract (May 31, 2005).
Non Final Office Action in co-pending U.S. Appl. No. 10/988,214, mailed Jul. 6, 2011, Enhanced Property Metal Polymer Composite, (11 pages).
Non Final Office Action in co-pending U.S. Appl. No. 12/769,500, mailed Mar. 29, 2012, Ceramic Composite, (17 pages).
Non Final Office Action mailed Jan. 27, 2012 in co-pending U.S. Appl. No. 12/769,553, 7 pages.
Non-Final Office Action, for U.S. Appl. No. 12/769,553 mailed Feb. 14, 2013, 36 pages.
Non-Final Office Action, for U.S. Appl. No. 12/769,500, mailed Sep. 12, 2013 (9 pages).
Non-Final Office Action, from U.S. Appl. No. 12/276,947, mailed May 7, 2013, 30 pages.
Non-Final Office Action, Mailed Apr. 20, 2012 Melt Molding Polymer Composite and Method of Making and Using the Same (33 pgs).
Non-Final Office Action, mailed Aug. 27, 2012 in U.S. Appl. No. 12/769,509, Inorganic Composite, (35 pages).
Non-Final Office Action, mailed Jan. 3, 2013 in co-pending U.S. Appl. No. 12/769,500, Ceramic Composite, (10 pages).
Non-Final Office Action, mailed Mar. 17, 2011 in co-pending U.S. Appl. No. 12/276,947, Enhanced Property Metal Polymer Composite, (55 pages).
Non-Final Office Action, mailed Mar. 25, 2011 in co-pending U.S. Appl. No. 12/278,638, Enhanced Property Metal Polymer Composite, (62 pages).
Non-Final Office Action, mailed Nov. 25, 2011 in co-pending U.S. Appl. No. 12/278,633, Metal Polymer Composite with Enhanced Viscoelastic and Thermal Properties, (31 pages).
Nontoxic High Density Compounds, PolyOne. Sep. 12, 2003. 2 pgs.
Notice of Allowance, for U.S. Appl. No. 12/355,203, mailed Mar. 28, 2013 (33 pages).
Notice of Non-Compliant Amendment, mailed Nov. 30, 2012 in co-pending U.S. Appl. No. 12/769,509, Inorganic Composite, (2 pages).
Notice on the Second Office Action, for Chinese Application No. 201080018729.1 mailed May 15, 2013 (18 pages).
Office Action, issued Jul. 27, 2011, in EP Application No. 10182673.3-2102, filed Sep. 29, 2010, 39 pages.
Office Action, issued Jun. 4, 2012, in Korea, Patent Application 2008-7022046, filed Feb. 10, 2006 English translation included, 16 pages.
Rothon, Particulate-Filled Polymer Composites, Second Edition, http://www.rapra.net/default.asp?Page=139&Lang=1&ChangeCurrency=$&ItemID=159 . . . , (pp. 1-6) (2003).
PCT Notification Concerning Transmittal of International Preliminary Report on Patentability, from International Application No. PCT/US10/32950, corresponding to U.S. Appl. No. 12/769,500, mailed Nov. 10, 2011, pp. 1-7.
PCT Notification Concerning Transmittal of International Preliminary Report on Patentability, from International Application No. PCT/US10/32956, corresponding to U.S. Appl. No. 12/769,509, mailed Nov. 10, 2011, pp. 1-7.
PCT Notification Concerning Transmittal of International Preliminary Report on Patentability, from International Application No. PCT/US10/32969, corresponding to U.S. Appl. No. 12/769,553, mailed Nov. 10, 2011, pp. 1-7.
Photomicrograph of Dispersed Regular Particles in Fractured Composite, 1 page; source date Nov. 4, 2012.
Manoudis, et al., Polymer-Silica Nanoparticles Composite Films as Protective Coatings for Stone-Based Monuments, Journal of Physics: Conference Series, vol. 61 (5 pages) (2007).
Cheney, Richard F., Production of Tungsten, Molybdenum, and Carbide Powders, Chemical and Metallurgical Division GTE Products Corporation (Date Unknown), (9 pages).
Putting it Together—The Science and Technology of Composite Materials, Nova Science in the News, http://www.science.org.au/nova/059/059key.htm, 4 pages (Date Printed Aug. 11, 2008).
Random House Unabridged Dictionary, Second Edition. Random House, Inc. (1993), (pp. 394; 993) 4 pgs.
Renewable Feedstock for Sustainable Materials—Bioproducts—Their Importance to Wales: A Scoping Study, the Centre for Advanced & Renewable Materials, (pp. 1-58) (Nov. 2002).
Response to Final Office Action, mailed Oct. 17, 2012 in co-pending U.S. Appl. No. 12/769,500, Ceramic Composite, filed Dec. 14, 2012 (11 pages).
Response to Non-Final Office Action, mailed Aug. 27, 2012 in co-pending U.S. Appl. No. 12/769,509, Inorganic Composite, filed Nov. 27, 2012 (21 pages).
Response to Notice of Non-Compliant Amendment, mailed Nov. 30, 2012 in co-pending U.S. Appl. No. 12/769,509, filed Dec. 10, 2012 (10 pages).
Response to Office Communication, Response to European Examination Report, dated Jan 4, 2011, Filed in the European Patent Office on Jul. 13, 2011 for EP Patent Application No. 09701577.0, corresponding to U.S. Appl. No. 12/355,203, (pp. 9).
Restriction Requirement, mailed Jul. 14, 2011 in co pending U.S. Appl. No. 12/278,633, Metal Polymer Composite with Enhanced Viscoelastic and Thermal Properties (4 pages).
Restriction Requirement, mailed Oct. 6, 2011 in co pending U.S. Appl. No. 12/355,203, Melt Molding Polymer Composite and Method of Making and Using the Same (6 pages).
Restriction Requirement, mailed May 24, 2012 in U.S. Appl. No. 12/769,509, Inorganic Composite , (8 pages).
Rheology Glossary, Rheology and viscosity testing, training and consultancy. www.rheologyschool.com/rheology_glossary.html. Feb. 13, 2012, 4 pgs.
Haque, A et al., S2-Glass/Epoxy Polymer Nanocomposites: Manufacturing,Structures, Thermal and Mechanical Properties, Journal of Composite Materials, vol. 37, No. 20, (pp. 1821-1837) (2003) (2 pg. abstract.
Haque, A et al., S2-Glass/Vinyl ester Polymer Nanocomposites: Manufacturing, Structures, Thermal and Mechanical Properties, 9 pgs. (Publicly Known at least as early as Nov. 24, 2008).
Plueddemann, Edwin P., Silane Coupling Agents, Second Edition. Scientist Emeritus Dow Corning Corporation Midland, Michigan. Plenum Press, new York and London. Springer-Verlag New York, LLC, Apr. 1991, 9 pgs.
Cho, et al., Some Observations on the Tribological Performance of Polymer Composites Filled with Minerals from Armenia, Wear and Tribology, http://ses.confex.com/ses/2004tm/techprogram/P1371.HTM, 1 pg. (Oct. 12, 2004).
Specifications, PolyOne. (first cited Mar. 4, 2013). 2 pgs.
Standard Specification for Biaxially Oriented Polymeric Resin Film for Capacitors in Electrical Equipment, ASTM International (2009), 7 pgs.
Steel Wheel Weights, Materials from Web Site of Suppliers of Auto Wheel Weights, 1 pg. (Date Printed Jan. 20, 2006).
Graham, J F. et al., Surface Derivatization of Nanoscale Tungsten Probes for Interfacial Force Microscopy, Interface Science Western, Department of Chemistry, University of Western Ontario, London, Ontario Canada. Mar. 23, 1999, 6 pgs.
Nickel, Ernest H., The Definition of a Mineral, The Canadian Mineralogist, vol. 33, (pp. 689) (1995).
Wadud, E. S., Time-Temperature Superposition Using DMA Creep Data, (Date Unknown). 4 pgs.
Tundra and 3M Silanes, http://www.gelest.com/gelestsearch/gelest/gelest_form.asp?formgroup=basenp_form_group and http://www.alfa.com/en/GP100W.pgm?DSSTK=L14043&rnd=573686392, Apr. 14, 2011, 3 pgs.
Shedd, Kim B. et al., Tungsten, US Geological Survey Minerals Yearbook. http://minerals.usgs.gov/minerals/pubs/commodity/tungsten/680400.pdf. (1999). 16 pgs.
Lassner, Erik et al., Tungsten: Properties, chemistry, Technology of the Element, Alloys, and Chemical Compounds, Vienna University

(56) References Cited

OTHER PUBLICATIONS of Technology Vienna, Austria. Kluwer Academic/ Plenum Publishers New York, Boston, Dordrecht, London, Moscow. Springer (1999), 4 pgs.

Zinc Wheel Weights, Materials from web sites of suppliers of auto wheel weights, 1 page (Date Printed Jan. 20, 2006).

CAS Registry Record for SI0591.0 (2 pgs.).

Chemical Book perfluoroalkylvinyl ether Product Information Obtained May 20, 2014 at http://www.chemicalbrook.com/ChemicalProductProperty_EN_CB4319708.htm.

DuPont Teflon Aqueous Dispersions, Product Information; copyright 2014.

"DuPont Teflon PTFE 6C Fluoropolymer Resin (PTFE Fine Powder)", Product Information, K-25657, May 2012 (2 pages).

"Final Office Action", for Japanese Patent Application No. 2012508730, mailed Dec. 24, 2013 (6 pages) including English translation.

"Final Office Action", for U.S. Appl. No. 12/276,947, mailed Nov. 7, 2013 (14 pages).

"Final Office Action", for U.S. Appl. No. 12/769,509, mailed Mar. 12, 2014 (12 pages).

"Final Office Action", for U.S. Appl. No. 12/769,553, mailed Jun. 20, 2014 (46 pages).

"Monte, Salvatore J.," Ken-React Reference Manual—Titanate, Zirconate and Aluminate Coupling Agents, Kenrich Petrochemicals, Inc. 1985 Second Revised Ed. Summer 1993 (pp. 171-186).

Non-Final Office Action, for U.S. Appl. No. 12/276,947, mailed Aug. 20, 2014 (15 pages).

"Non-Final Office Action", for U.S. Appl. No. 12/769,509, mailed Jul. 31, 2014 (15 pages).

"Non-Final Office Action", for U.S. Appl. No. 12/769,509, mailed Nov. 13, 2013 (17 pages).

"Notice of Allowance", for U.S. Appl. No. 12/769,500, mailed May 12, 2014 (13 pages).

"Ptfe Characteristics and Applications of Fluon PTFE Aqueous Dispersions", Product Information, retrieved May 2014.

"Reliability and Key Properties of RT/duroid 6002", Rogers Corporation Advanced Circuit Materials Properties 2.9.4; copyright 1992-2002.

"Response to Article 94(3) EPC Action", from EP Application No. 10182673.3, filed Jan. 24, 2012, 15 pages.

"Response to Final Office Action", for U.S. Appl. No. 12/769,553, filed Jul. 21, 2014 (10 pages).

"Response to Final Office Action", for U.S. Appl. No. 12/769,509, filed May 21, 2014 (12 pages).

"Response to Final Office Action", for U.S. Appl. No. 12/276,947, submitted Feb. 5, 2014 (24 pages).

"Response to Non Final Office Action mailed Jul. 31, 2014", in U.S. Appl. No. 12/769,509, 16 pages.

"Response to Non-Final Office Action", from U.S. Appl. No. 12/769,553, filed Jun. 14, 2013, 67 pages.

"RT/duroid 6002 High Frequency Laminates", Rogers Corporation Data Sheet, copyright 2014.

"Second Office Action", for Chinese Patent Application No. 201080018728.7, mailed Feb. 8, 2014 (7 pages) with English translation.

"Final Office Action," for U.S. Appl. No. 12/276,947, mailed Mar. 10, 2015 (22 pages).

"Final Office Action," for U.S. Appl. No. 12/769,509, mailed Feb. 20, 2015 (14 pages).

"Non Final Office Action," for U.S. Appl. No. 13/762,714, mailed on Feb. 4, 2015 (56 pages).

* cited by examiner

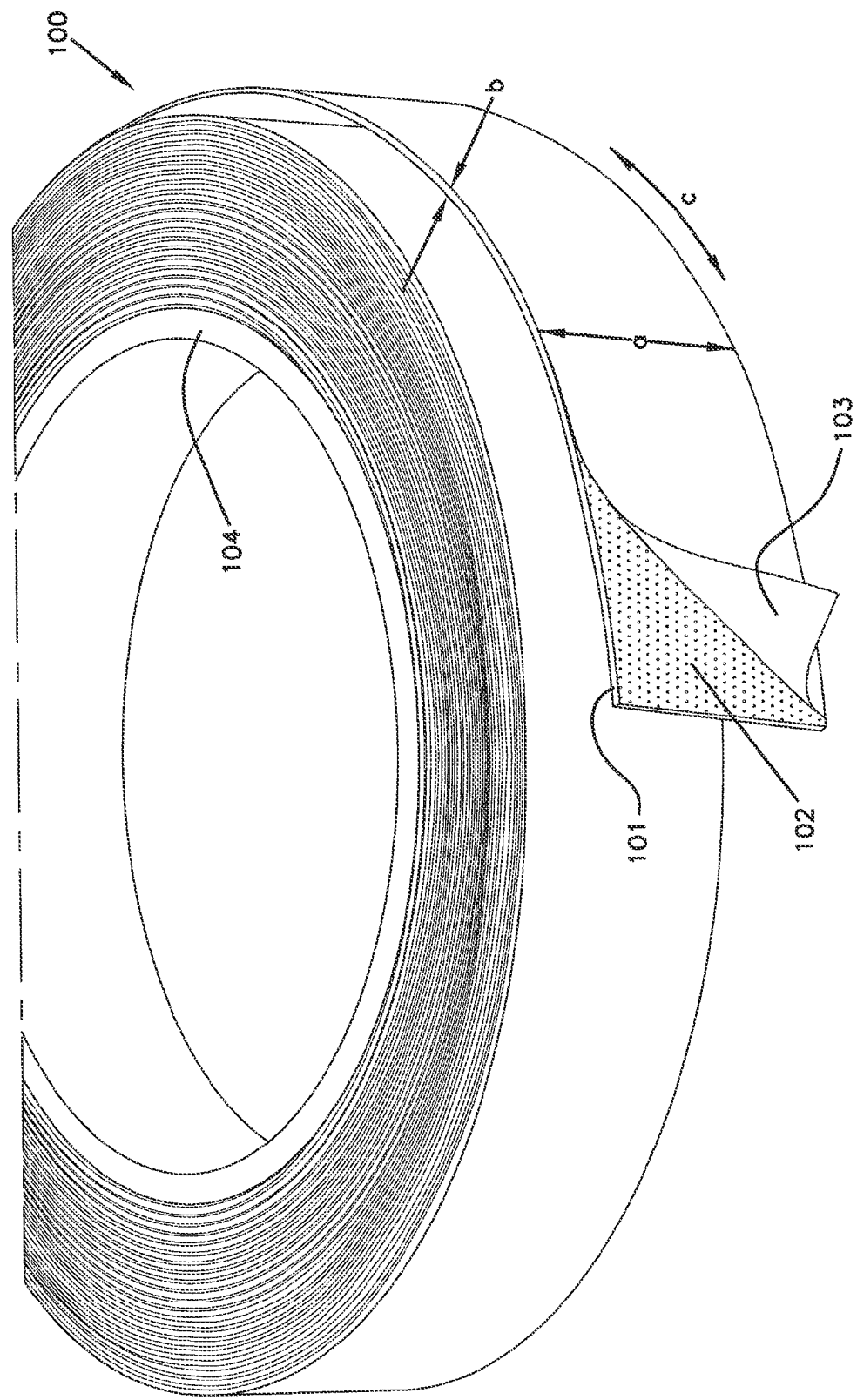

MAGNETIC COMPOSITE

CROSS-REFERENCE TO RELATED APPLICATION

This application is a continuation-in-part application of U.S. application Ser. No. 12/769,500, filed Apr. 28, 2010, now issued as U.S. Pat. No. 8,841,358, which claims priority under 35 U.S.C. §119(e) to U.S. provisional application Ser. No. 61/173,791, filed Apr. 29, 2009; this application is also a continuation-in-part application of U.S. application Ser. No. 12/769,509, filed Apr. 28, 2010, which claims priority under 35 U.S.C. §119(e) to U.S. provisional application Ser. No. 61/173,791, filed Apr. 29, 2009; this application is also a continuation-in-part application of U.S. application Ser. No. 10/988,214, filed Nov. 12, 2004, which claims priority under 35 U.S.C. §119(e) to U.S. provisional application Ser. No. 60/520,507 filed on Nov. 14, 2003, and Ser. No. 60/571,060 filed on May 14, 2004, all application of which are hereby incorporated by reference herein.

FIELD OF THE INVENTION

The invention relates to thermoplastic composite comprising a magnetic particle and a polymer with enhanced magnetic, structural and viscoelastic properties. The novel properties are produced in the composite by novel interactions of the components. The composite materials are not simple admixtures, but obtain superior magnetic, structural, mechanical, electrical and other properties from a unique combination of particulate, particle coating of interfacial modifier components and polymer material that optimizes the composite structure and characteristics through thermoplastic or melt blending the materials to achieve true composite properties.

BACKGROUND OF THE INVENTION

Composite materials have been made for many years by combining generally two dissimilar materials to obtain beneficial properties from both. A true composite is unique because the interaction of the materials provides the best properties of both components. Many types of composite materials are known and are not simple admixtures. Simply combining typically a thermoplastic polymer phase with a filler, (i.e.) a powder or fiber, produces a range of filled materials. A filled polymer, with the additive as filler, typically cannot display composite properties. A filler material typically is comprised of inorganic materials that act as either pigments or extenders for the polymer systems. A vast variety of fiber-reinforced composites have been made typically to obtain fiber reinforcement properties to improve the mechanical properties of the polymer in a unique composite.

A substantial need exists for a thermoplastic magnetic material that has improved properties in terms of electrical/magnetic, malleability, injection molding capability, structural, mechanical and viscoelastic properties.

BRIEF DESCRIPTION OF THE INVENTION

Magnetic composite material is disclosed having improved and novel properties with respect to prior art materials. The material of the invention, through a selection of magnetic material, particle size ($P_s$) distribution, polymer type, molecular weight, particle surface modification with an interfacial modifier and processing conditions, attains improved properties. The composite is optimized through polymer selection, particle selection; minimization of the polymer filled excluded volume of the composite. The particles have a specific and novel particle morphology that cooperates with the components of the invention to provide the needed properties to the composite. The material attains adjustable magnetic, chemical/physical properties through particle selection and polymer selection. The resulting composite materials exceed the prior art composites in terms of magnetic character density, reduced toxicity, improved malleability, improved ductility, improved viscoelastic properties (such as tensile modulus, storage modulus, elastic-plastic deformation and others) electrical/magnetic properties, and machine molding properties.

We have found that density and polymer viscoelasticity measured as elongation are useful properties and useful predictive parameters of a true composite in this technology. In the production of useful enhanced properties, the packing of the selected particle size and distribution and the selection of the magnetic particulate with mixed particulate, will obtain the enhanced properties. The use of compositions further comprising a coating of an interfacial modifier demonstrates improved utilization of material properties and improved performance, such as elongation and other properties. Preferred composites can be combined with one or more polymers of a given molecular weight distribution and one or more metal particulates with a given distribution to obtain unique composites. The materials can exceed the prior art composites in terms of density, reduced toxicity, improved malleability, improved ductility, improved viscoelastic properties and machine molding properties. We have produced true composites and can obtain structural and viscoelastic properties. We have produced a composite by using an interfacial modifier to improve the association of the particulate with the polymer. We have found that the composite materials of the invention can have a designed level of magnetic properties resulting from careful composition blending. The novel viscoelastic properties make the materials useful in a variety of uses not filled by composites and provide a material easily made and formed into useful shapes. We have also found a unique method of optimizing magnetic properties in the composite as it is extruded and magnetized.

In one embodiment of the invention a selected particulate having a specified particle size and size distribution is combined with a polymer with a molecular weight distribution to form an improved composite. Such particles can have a defined circularity that promotes maximum property development.

In another embodiment, an interfacial modifier is used to ensure that the proportions of particulate and polymer obtain the minimum excluded volume filled with polymer, the highest particulate packing densities, the maximize polymer composite material properties and obtain the maximum utilization of materials. Maximizing particle content can enhance magnetic properties. The materials of the invention can contain other particulates, pigments or other ingredients to modify physical properties or the visual appearance of the materials. Mixed metal particulate, bimetallic (e.g. WC) or alloy metal composites can be used to tailor properties for specific uses. These properties include but are not limited to density, thermal properties such as conductivity, magnetic properties, electrical properties such as conductivity, color, etc. These materials and combination of materials can be used as solid-state electrochemical (e.g. battery) and semiconductor structures. Preferred selected particle or particle blends can also be combined with one or more polymers to obtain unique composites. A secondary metal can be combined. A composite can comprise a variety of different combinations of metals and polymers. The particulate can contain the magnetic particle and one or two metal particulates of different metals. Properties can include electrical properties, magnetic properties, physical properties, including heat conductivity, acoustical shielding, etc. and can be optimized. Examples of secondary metals include, but not limited to, iron, copper, nickel, cobalt, bismuth, tin, cadmium and zinc. The materials of the invention permit the design engineers the flexibility to tailor the composite to end-uses and avoid the use of toxic or radioactive materials unless desired.

Briefly, using the technology of the invention, the metal polymer composites of the invention can provide enhanced polymer composite properties. One important material comprises a composite having a magnetic flux density (or magnetic induction (B)) in Teslas on a magnetic field in Oersteds (Oe). The composite comprises a magnetic particulate, a polymer, and optionally an interfacial modifier material. The compositions of the invention can also contain other additives such as a visual indicator, fluorescent marker, dye or pigment at an amount of at least about 0.01 to 5 wt %. The composites of the invention comprise about 60 to 99.5 wt.-% metal, 40 to 90 volume-% metal, 0.5 to 40 wt.-% polymer, 10 to 60 volume-% polymer in the composite.

Enhanced composites can be made by forming a composite in which the particulate is obtained at the highest possible packing density of the particulate and with a polymer phase that substantially completely occupies only the minimized excluded volume of the particulate. Using a particulate, packing the particulate and combining the particulate with just sufficient polymer such that only the excluded volume of the particulate is filled can optimize magnetic and other modulus and flexural properties of the composite material. The ultimate composite properties are largely controlled by efficiency in packing of the particulate in the composite and the associated efficiency in filling the unoccupied voids in the densely packed particulate with high density polymer material. We have found that the packing and filling efficiency can be improved by a careful selection of particle shape, size and size distribution. The particulate should be greater than 1 micron (a particle size greater than about 1 micron means that a small portion of the particulate is less than 1 micron, in fact, less than 10 wt.-% often less than 5 wt.-% of the particulate is less than 1 micron). The particle size distribution should be broad and typically include particles about, 1 to 5 microns, 1 to 10 microns, 1 to 100 microns, or 1 to 1000 microns. The particulate distribution can contain at least some particulate (at least 5 wt.-%) in the range of about 10 to 100 microns, the particulate can also contain at least some particulate (at least 5 wt.-%) in the range greater than 100, about 100 to 250 microns, optionally the particulate can contain some particulate (at least 5 wt.-%) in the range of about 250 to 1000 microns. This distribution can be normal, Gaussian, log normal or skew normal but must include the desired range of particle sizes. For larger particles, greater than 10 microns, domains can be formed where the magnetic moments are aligned. Domains are small regions of the particle where all the magnetic moments are aligned. The domains may be continuous or discontinuous. The magnetic moments in the domain become oriented in response to an external magnetic field energy source. In an embodiment, this response is defined as domain modification of the particle. A true composite is obtained by carefully processing the combined polymer and particulate until wanted properties reach a level showing that using an interfacial modifier to promote composite formation results in enhanced property development.

Thermoplastic resins can be used in the invention. Such resins are discussed in more detail below. In the case of thermoplastic resins, the composites are specifically formed by blending the particulate and interfacial modifier with thermoplastic and then forming the material into a finished composite. The particulate material is typically externally coated with an interfacial modifier, a surface chemical treatment that supports or enhances the final properties of the composite.

In a composite, atoms or molecules can form bonds with other atoms or molecules using a number of mechanisms. Such bonding can occur between the electron cloud of an atom or molecular surfaces including molecular-molecular interactions, atom-molecular interactions and atom-atom interactions. Each bonding mechanism involves characteristic forces and dimensions between the atomic centers even in molecular interactions. The important aspect of such bonding force is strength, the variation of bonding strength over distance and directionality. The major forces in such bonding include ionic bonding, covalent bonding and the van der Waals' (VDW) types of bonding. Ionic radii and bonding occur in ionic species such as $Na^+Cl^-$, $Li^+F^-$. Such ionic species form ionic bonds between the atomic centers. Such bonding is substantial, often substantially greater than 100 kJ-$mol^{-1}$ often greater than 250 kJ-$mol^{-1}$. Further, the interatomic distance for ionic radii tend to be small and on the order of 1-3 Å. Covalent bonding results from the overlap of electron clouds surrounding atoms forming a direct covalent bond between atomic centers. The covalent bond strengths are substantial, are roughly equivalent to ionic bonding and tend to have somewhat smaller interatomic distances.

The varied types of van der Waals' forces are different than covalent and ionic bonding. These van der Waals' forces tend to be forces between molecules, not between atomic centers. The van der Waals' forces are typically divided into three types of forces including dipole-dipole forces, dispersion forces and hydrogen bonding. Dipole-dipole forces are a van der Waals' force arising from temporary or permanent variations in the amount or distribution of charge on a molecule.

| Summary of Chemical Forces and Interactions | | | |
|---|---|---|---|
| Type of Interaction | Strength | Bond Nature | Strength Proportional to: |
| Covalent bond | Very strong | Comparatively long range | $r^{-1}$ |
| Ionic bond | Very strong | Comparatively long range | $r^{-1}$ |
| Ion-dipole | Strong | Short range | $r^{-2}$ |
| VDW Dipole-dipole | Moderately strong | Short range | $r^{-3}$ |
| VDW Ion-induced dipole | Weak | Very short range | $r^{-4}$ |
| VDW Dipole-induced dipole | Very weak | Extremely short range | $r^{-6}$ |
| VDW London dispersion forces | Very weak [a] | Extremely short range | $r^{-6}$ |

[a] Since VDW London forces increase with increasing size and there is no limit to the size of molecules, these forces can become rather large. In general, however, they are very weak.

Dipole structures arise by the separation of charges on a molecule creating a generally or partially positive and a generally or partially negative opposite end. The forces arise from electrostatic interaction between the molecule negative and positive regions. Hydrogen bonding is a dipole-dipole interaction between a hydrogen atom and an electronegative region in a molecule, typically comprising an oxygen, fluorine, nitrogen or other relatively electronegative (compared to H) site. These atoms attain a dipole negative charge attracting a dipole-dipole interaction with a hydrogen atom having a positive charge. Dispersion force is the van der Waals' force existing between substantially non-polar uncharged molecules. While this force occurs in non-polar molecules, the force arises from the movement of electrons within the molecule. Because of the rapidity of motion within the electron cloud, the non-polar molecule attains a small but meaningful instantaneous charge as electron movement causes a temporary change in the polarization of the molecule. These minor fluctuations in charge result in the dispersion portion of the van der Waals' force.

Such VDW forces, because of the nature of the dipole or the fluctuating polarization of the molecule, tend to be low in bond strength, typically 50 kJ mol$^{-1}$ or less. Further, the range at which the force becomes attractive is also substantially greater than ionic or covalent bonding and tends to be about 3-10 Å.

In the van der Waals bonded composite materials of this invention, we have found that the unique combination of particulate, the varying particle size of the magnetic particle component, the modification of the interaction between the particulate and the polymer, result in the creation of a unique van der Waals' bonding. The van der Waals' forces arise between particulate atoms/crystals in the particulate and are created by the combination of particle size, polymer and interfacial modifiers in the magnetic particle polymer composite. In the past, materials that are characterized as "composite" have merely comprised a polymer filled with particulate with little or no van der Waals' interaction between the particulate filler material. In the invention, the interaction between the selection of particle size distribution and interfacially modified polymer enables the particulate to achieve an intermolecular distance that creates a substantial van der Waals' bond strength. The prior art materials having little viscoelastic properties, do not achieve a true composite structure. This leads us to conclude that this intermolecular distance is not attained in the prior art. In the discussion above, the term "molecule" can be used to relate to a particle of metal, a particle comprising metal crystal or an amorphous metal aggregate, other molecular or atomic units or sub-units of metal or metal mixtures. In the composites of the invention, the van der Waals' forces occur between collections of magnetic particle atoms that act as "molecules" in the form of crystals, or other atom aggregates. The composite of the invention is characterized by a composite having intermolecular forces between particulates that are in the range of van der Waals' strength, i.e., between about 5 and about 30 kJ-mol$^{-1}$ and a bond dimension of 3-10 Å. The magnetic particulate in the composite of the invention has a range of particle sizes such that about at least 5 wt.-% of particulate in the range of about 1 to 5 microns, 1 to 10 microns, 1 to 100 microns or 1 to 1000 microns or mixtures thereof and a polymer, the composite having a van der Waals' dispersion bond strength between molecules in adjacent particles of less than about 4 kJ-mol$^{-1}$ and a bond dimension of 1.4 to 1.9 Å or less than about 2 kJ-mol$^{-1}$ and the van der Waals' bond dimension is about 1.5 to 1.8 Å.

In a composite, the reinforcement is usually much stronger and stiffer than the matrix, and gives the composite its good properties. The matrix holds the reinforcements in an orderly high-density pattern. Because the reinforcements are usually discontinuous, the matrix also helps to transfer load among the reinforcements. Processing can aid in the mixing and filling of the reinforcement particle phase. To aid in the mixture, an interfacial modifier can help to overcome the forces that prevent the matrix from forming a substantially continuous phase of the composite. The interfacial modifier enables the particle to become "invisible" or immiscible in the base polymer phase and enables or supports the fullest expression of the base polymer properties such as, for example, viscoelasticity. The composite properties arise from the intimate association obtained by use of careful processing and manufacture. We believe an interfacial modifier is an organic material that provides an exterior coating on the particulate promoting the close association (but with substantially no covalent bonding to the polymer) of polymer and particulate. Minimal amounts of the modifier can be used including about 0.005 to 8 wt.-%, or about 0.02 to 3 wt. %. Such a coating can have a thickness of about 0.01 to 1 micron.

For the purpose of this disclosure, the terms "magnetic particle" refers to a particle collection of a particulate material that, in bulk, can be modified to obtain a permanent magnetic field.

For the purpose of this disclosure, the term "metal" relates to metal in an oxidation state, approximately 0, with up to 25 wt.-% or about 0.001 to 10 wt.-% as an oxide or a metal or non-metal contaminant, not in association with ionic, covalent or chelating (complexing) agents. For the purpose of this disclosure, the term "particulate" typically refers to a material made into a product having a particle size greater than 1 micron and having a particle size distribution containing at least some particulate in the size range of 1 to 100 microns. The particles have a range of sizes and circularity parameters.

In a packed state, this particulate has an excluded volume of about 13 to 61 vol.-% or about 30 to 75 vol.-%. Alternatively, the particulate can have greater than about 30 vol. %, greater than about 40 vol. % or about 40 to 70 vol.-% particle loading. In this invention, the particulate can comprise two three or more particulate sources, in a blend of metals, inorganic minerals, glass bubbles (hollow glass spheres) or ceramics of differing chemical and physical nature and materials of differing chemical and physical nature. Regarding the particulate material, the term a "majority of the particulate" indicates that while the particulate can contain some small amount of small fines and some particles that are large with respect to the recited range, the majority (greater than 95%, 90%, 85%, etc.) fall within the recited range and contribute to the physical properties of the composite.

For the purpose of this disclosure, the term "non-metallic" relates to a material substantially free of a metal in an oxidation state, approximately 0.

A ceramic particle is typically defined as an inorganic crystalline oxide material. Ceramics are typically solid and inert. Ceramic materials tend to be brittle, hard, strong in compression and weak in shear or tension. Ceramics generally have a very high melting point that is typically greater than 1,000° C., but often ranges from 1,800 to 3,000° C. and in some cases even higher. Traditionally, ceramic materials include materials derived from clay, such as kaolinite. More recent ceramic materials include various silicates, aluminum oxide, silicon carbide and tungsten carbide. Other ceramics include oxides of aluminum and zirconium. Non-oxide ceramics include metal carbides, metal borides, metal nitrides and metal silicide. Other materials can be used in the composites of the invention including minerals, hollow and solid glass spheres and other particulates.

For the purpose of this disclosure, the term "inorganic" relates to a material substantially free of carbon in the form or organic carbon or covalently bonded carbon compounds. Accordingly, compounds such as calcium carbonate or sodium bicarbonate are considered inorganic materials while most organic compounds including small molecules such as methane, ethane, ethylene, propylene, related polymer species, etc., are commonly considered organic materials. Other particulate material can be used in the inorganic compositions. Examples of such materials are as follows.

A "mineral" is defined as an element or chemical compound that is normally crystalline and that has been formed as a result of geological processes (Ernest H. Nickel, 1995, *The definition of a mineral*, The Canadian Mineralogist, vol. 33, pp. 689-690). For the purpose of this invention, the term "non-metal, inorganic or mineral" (mineral) is defined, as above, as an element or chemical compound that is normally crystalline and that has been formed as a result of geological processes. Other materials can be used in the composites of the invention including ceramics, hollow and solid glass spheres and other particulates.

A "hollow glass sphere or bubble" is defined as a glass body having a generally spherical shape having a hollow interior. The glass sphere typically has a particle size ($P_s$) that ranges from about 1 to 150 microns, typically about 10 to 120 microns, preferably about 10 to 100 microns. The internal space within the glass bubble typically ranges from about 56 to 120 microns, often about 68 to 100 microns. Solid glass spheres can also have similar particle size ($P_s$) sizes. These materials can help reduce density if needed and can reduce corrosion of metal components.

Traditionally, ceramic materials include various silicates, materials derived from clay, such as kaolinite. More recent ceramic materials include aluminum oxide, silicon carbide and tungsten carbide.

An "inorganic mineral" as understood in the context of this application includes natural inorganic materials that are not ceramics as defined above. Inorganic compounds are considered to be of a mineral, not biological origin. Inorganic minerals as understood in this application do not include organo metallic chemistry compounds including metal ions surround by organic ligands. Inorganic compound as minerals typically include inorganic minerals that are found in nature or their synthetic equivalents. Commonly available inorganic minerals include mineral carbonates, mineral aluminates, mineral alumino-silicates, mineral oxides, mineral hydroxides, mineral bicarbonates, mineral sulfates, mineral fluorides, mineral phosphates, mineral alumino-phosphates, and mineral alumino-silicates. Garnet is a useful mineral having the formula $X_3Y_2(SiO_4)_3$ wherein X is divalent Ca, Fe or Mg and Y is trivalent Al, Fe or Cr. Examples of inorganic minerals include bauxite (aluminum ore), calcium carbonate, calcium hydroxide, calcium sulfate, cuprous and cupric sulfide, lead oxide, magnesium carbonate, magnesium oxide, magnesium sulfate, magnesium alum compounds, such as potassium alumino-silicate, potassium borate, potassium carbonate, potassium sulfate and other compounds, including sodium silicate, sodium sulfate, etc.

For the purpose of this disclosure, the term magnet means a composition or object that produces a magnetic field due to the electronic nature of the constituent material. A permanent magnet is typically an object that is magnetized by exposure to a magnetic field but maintains its own persistent or permanent magnetic field after magnetization. The materials of the invention are permanent magnets and are typically not considered to be electromagnets which obtain their magnetic properties due to an electrical current passing through a conductor which can be used as a coil or as a coil wrapped around a ferromagnetic material. The overall strength of a magnet is measured by its magnetic moment or its total magnetic flux as measured in Teslas. Ferromagnetic materials are typically permanent magnets having constituent materials that have unpaired electron spins. When magnetized, the spins can interact in such a way that the spins align spontaneously and produce a magnetic field as a result of the regular crystalline anatomic structure that obtains and maintains spin alignment. Ferromagnetic materials can be used in the form of naturally occurring materials, composites, alnico magnets, rare earth metal magnets and others.

For the purpose of this disclosure, the term "indeterminate length" indicates that the material has a defined thickness and width but the length can be any arbitrary length that can be coiled or otherwise handled. Such indeterminate lengths of the material is made in the form of a reel or coil such that an arbitrary amount of the material can be formed in the reel or the coil but the material can have a defined width and thickness.

The magnetic properties can be measured by one of two ways; either by a substantially mechanical 180° or 90° peel strength or by measuring the magnetic field strength (H) in Oersteds or the magnetic induction (B) in Gauss. In SI units, B is measured in Teslas (T) or Gauss (G) and correspondingly $\Phi_B$ (magnetic flux) is measured in webers (symbol: Wb) so that a flux density of 1 Wb-m$^{-2}$ is 1 tesla. The SI unit of tesla is equivalent to newton·second) divided by (coulomb·meter). In Gaussian-cgs units, B is measured in Gauss (symbol: G). (The conversion is 1 T=$10^5$ G.) The H-field is measured in ampere per meter (A/m) in SI units, and in Oersteds (Oe–cgs units). Test methods for mechanical 180° or 90° peel strength is done similar to parallel testing for adhesive materials using Instron type machine testing methods. The 90° or 180° peel test is done the same as the tensile test. When the two (magnetic and steel) components are assembled, the test apparatus, with the help of an appropriate tensile machine, applies increasing force in order separate (peel) the magnetic material form the steel coupon in either a normal; direction (90° peel strength) or parallel to the coupon (180° peel test). In the test a sample of the magnetic material (dimensions—2 cm width×5 cm length×2 mm thickness) is assembled with a similarly sized steel coupon. An end of the magnetic material and an end of the steel coupon (appropriate for the 90° or 180° peel test) is attached to the test puller. Force is applied and the force necessary to separate the magnetic materials from the coupon is measured. Test methods for magnetic properties are set forth in ASTM A977/A977M-07; *Standard Test Method for Magnetic Properties of High-Coerctivity Permanent Magnet Materials Using Hysteresis-graphs*.

Particle Morphology Index

The interfacial modification technology depends on the ability to isolate the particles from that of the continuous polymer phase. The isolation of the particulates requires placement of a continuous molecular layer(s) of interfacial modifier to be distributed over the surface of the particles. Once this layer is applied, the behavior at the interface of the interfacial modifier to polymer dominates the physical properties of the composite (e.g. tensile and elongation behavior) while the bulk nature of the particle dominates the bulk material characteristics of the composite (e.g. density, thermal conductivity, compressive strength). The correlation of particulate bulk properties to that of the final composite is especially strong due to the high volume percentage loadings of particulate phase associated with the technology.

There are two key attributes of the particle surface that dictate the ability to be successfully interfacially modified: 1) The overall surface area of the particles on a large scale; large being defined as about 100× or more compared to the molecular size of the interfacial modifier. In the case of NZ-12, the molecular diameter is about 2260 pm and 2) Particle surface characteristics that are on the order of the size of the interfacial modifier being applied.

The following particle morphology attributes specifically contribute to the ability to effectively interfacially modify the particles. Combining the different particle attributes we have derived a particle morphology index. Discussion will reveal that vastly different particle types can be effectively modified from large, smooth, round, and impervious surface types (low particle morphology index) to small, rough, irregular and porous (high particle morphology index):

Particle Size ($P_s$)

A wide range of particle sizes can be effectively interfacially modified. Successful modification has been completed with particles with a major dimension as small as −635 US mesh (<20 µm) to particles as large as −40 US mesh (−425 µm). Undoubtedly, larger particle sizes can be effectively modified (1,500 µm or greater). The absolute size of the particle being modified is not important; the relative size of the major dimension of the largest particle to the minimum critical dimension of the end article is more important. Our composite experience guides us that the major dimension of the largest particles should not be more than ⅕$^{th}$ of the minimum critical dimension of the end article.

As the particles become smaller the particulate surface area increases. For smooth spheres of a constant density, there is 28 times more surface area in spheres of 15 µm than 425 µm particle size ($P_s$) within a given mass of material. There is 100 times the surface area for particles of 1,500 µm particle size ($P_s$) compared to 15 µm.

Dosage levels of interfacial modifier have been effectively adjusted to compensate for changes in surface area due to particle size shifts.

Particle Shape/Aspect Ratio ($P_{sh}$)

The benefit of interfacial modification is independent of overall particle shape. Particles with an aspect ratio of 1 (glass bubbles of iM30K and ceramic G200 microspheres) to 10 (some particularly irregularly shaped garnet) have been favorably interfacially modified. The current upper limit constraint is associated with challenges of successful dispersion of fibers within laboratory compounding equipment without significantly damaging the high aspect ratio fibers. Furthermore, inherent rheological challenges are associated with high aspect ratio fibers. With proper engineering, the ability to successfully compound and produce interfacially modify fibers of fiber fragments with aspect ratio in excess of 10 is envisioned.

At a given minor axis particle dimension, the relationship of particle aspect ratio to surface area is given by:

$$\text{Sphere} = \pi D^2; \text{ and}$$

$$AR\text{object} = \pi D^2(r_a + 0.5);$$

wherein D is diameter or particle size ($P_s$), $r_a$ is aspect ratio. For a given minor dimension, the surface area of a particle with an aspect ratio of 10 has 10.5 times the surface area than a spherical particle. Dosage levels of interfacial modifier can be adjusted to compensate for the variance in surface area due to shape effects.

Particle Roughness ($P_r$)

Macroscopic particle roughness (defined here as 100× the diameter of the interfacial modifier) can be defined by the circularity of the particle. It has been shown that interfacially modified mineral or inorganic particulates with rough and substantially non-spherical shapes obtain the similar advantageous rheology and physical property results as regularly shaped particles. The circularity or roughness of the particle can be measured by microscopic inspection of the particles in which an automated or manual measurement of roughness can be calculated. In such a measurement, the perimeter of a representative selection of the particulate is selected and the area of the particle cross section is also measured. The circularity of the particle is calculated by the following formula:

$$\text{Circularity} = (\text{perimeter})^2/\text{area}.$$

Such materials such as the ceramic microspheres and hollow glass bubbles have a circularity of 4π (for smooth spherical particles) to 50 (smooth particles with an aspect ratio of 10). Many inorganic and mineral particulate have an oblong, multi lobe, rough non-regular shape or aspect. Such materials have a circularity of 13 to 35 or 13 to 30 and obtain the improved viscoelastic properties of the invention. Using proper optical and image analysis techniques the decoupling of surface roughness and aspect ratio can be determined under the appropriate magnification to quantify large scale particle roughness. The multiplier for the derivation of the particle morphology index must be adjusted for the aspect ratio of the particle.

An alternative to optical procedures consists of using a BET analysis to determine the specific surface area of the particulate phase. The specific surface area captures both the macroscopic particle roughness and particle porosity discussed below for particles of a specific particle size and shape distribution.

Particle Porosity ($P_p$)

The interfacial modifiers are quite large, on the order of a few hundred to a few thousand molecular weight. Within a class of compounds, the effective diameter of the modifier molecule is proportional to the molecular weight. The predicted diameter of the NZ-12 zirconate modifier is 2260 picometer with a molecular weight of 2616 g/mol. The minimum size of the modifier molecules would be about 400 picometer (assuming a molecular weight of 460 g/mol). The size of the titanate modifiers would be slightly smaller than the corresponding zirconate for a corresponding given organophosphate structure.

Literature review of BET surface analysis reveals a large difference in particle surface area of mineral particles (from 0.1 to >100 m$^2$·gm$^{-1}$). Nonporous spheres with a diameter of 1,500 micron results in a specific area of 0.017 m$^2$·gm$^{-1}$. In all cases, successful interfacial modification of the particulates is possible via changes in modifier loading. It is important to note that required increase in dosage is not directly proportional to the BET surface measurements. The pore size penetrable by the BET probing gas is significantly smaller (20.5 Å$^2$ for krypton for example) than the interfacial modifier. Silica sand had a pore size of 0.90 nm as determined by BET analysis, the interfacial modifier molecule is able to bridge the pore opening. It will be possible to successfully interfacially modify porous absorbents such that the particles composite rheology is improved while absorbent properties of the particulate are maintained due to the relative size differences in the interfacial modifier (large), pore size being bridged (small), and the size of the absorbent molecule (nitrogen, argon, water, etc.) diffusing through the interfacial modifier into the absorbent particulate.

The particle morphology index is defined as:

$$\text{PMI} = (P_s)(P_{sh})(P_r)(P_p)$$

For large, spherical, smooth, non-porous particles the particle morphology index=1 to 200. For small, rough, porous particles with an aspect ratio of 10, the maximum particle morphology index=100×10.5×100/0.1=10$^6$. Certain particles with a range of sizes or particle size ($P_s$) and aspect ratios, some roughness and porosity can range from 200 to 10$^4$. Other particles with a broadened range of sizes or particle size ($P_s$) and aspect ratios, substantial roughness and increased porosity can range from $2\times10^4$ to $10^6$. The amount of interfacial modifier increases with the particle morphology index.

The result of the above particle attributes (particle size and distribution, particle shape, and roughness) results in a specific particle packing behavior. The relationship of these variables leads to a resultant packing fraction. Packing fraction is defined as:

$$P_f = P_d / d_{pync}$$

wherein $P_f$=packing fraction; $P_d$=packing density and $d_{pync}$=pyncometer density. The relationship of these variables upon particle packing behavior is well characterized and used within powdered metallurgy science. For the case of spherical particles, it is well known that particle packing increases when the size difference between large to small particles increases. With a size ratio of 73 parts by weight large particle:27 parts by weight small, monodispersed spheres with a 7:1 size ratio, the small particles can fit within interstitial spaces of the large particles resulting in a packing level of about 86 volume percent. In practice, it is not possible to attain monodispersed spheres. We have found that increased packing is best when using particles of broad particle size distribution with as large of a size difference between them as possible. In cases like these, we have found packing percentages approaching 80 volume %.

For composites containing high volumetric loading of spherical particles, the rheological behavior of the highly packed composites depends on the characteristics of the contact points between the particles and the distance between particles. When forming composites with polymeric volumes approximately equal to the excluded volume of the particulate phase, inter-particle interaction dominates the behavior of the material. Particles contact one another and the combination of interacting sharp edges, soft surfaces (resulting in gouging) and the friction between the surfaces prevent further or optimal packing. Interfacial modifying chemistries are capable of altering the surface of the particulate by coordination bonding, Van der Waals forces, covalent bonding, or a combination of all three. The surface of the interfacially modified particle behaves as a particle of the interfacial modifier. These organics reduce the friction between particles preventing gouging and allowing for greater freedom of movement between particles. The benefits of utilizing particles in the aforementioned acceptable particle morphology index range does not become evident until packing to a significant proportion of the maximum packing fraction; this value is typically greater than approximately 40 volume % particle phase of the composite.

The spatial character of the particles of the invention can be defined by the circularity of the particle and by its aspect ratio. One surprising aspect of the invention is that even a particle that departs from smooth spherical particle shape and are non-spherical or have substantial aspect ratio are efficiently packed in the composite of the invention. Mineral or inorganic particulates with amorphous, rough and substantially non-spherical shapes obtain the same advantageous rheology as regularly shaped particles. The aspect ratio of the more regular particles of the invention should be less than 1:5 and often less than 1:1.5. Similarly, the particulate with an aspect ratio of less than 10 or about 5:1 also obtain the benefits of the composites of the invention.

We have found that the use of the interfacial modifier disclosed in this application obtains a close association of both spherical and substantially aspherical particles such that effective composites can be made even with particles that substantially depart from the ideal spherical particle (high circularity, i.e. greater than 15). Many inorganic or mineral particles, depending on source and processing can have a narrow particle size distribution, a very regular surface, a low aspect ratio and substantial circularity while other such particles can have a very amorphous non-regular geometry and surface characteristic. We have found that the processes of the invention and the composites made using the interfacial modifier of the invention can obtain useful composites from most particle species disclosed herein.

In the composites of the invention, the van der Waals' forces occur between collections of particles that act as "molecules" in the form of crystals or other mineral particle aggregates. The composite of the invention is characterized by a composite having intermolecular forces between particulates that are in the range of van der Waals' strength, i.e., ranges and definitions if appropriate.

In a composite, the particle is usually much stronger and stiffer than the polymer matrix, and gives the composite its designed properties. The matrix holds the particle in an orderly high-density pattern. Because the particles are usually discontinuous, the matrix also helps to transfer load among the particles. Processing can aid in the mixing and filling of the polymer with the particle or particle blend. To aid in the mixture, an interfacial modifier, a surface chemical treatment or modifier can help to overcome the forces that prevent the matrix from forming a substantially continuous phase of the composite. The tunable composite properties arise from the intimate association obtained by use of careful processing and manufacture. We believe a surface chemical reagent or interfacial modifier is an organic material that provides an exterior coating on the particulate promoting the close association of polymer and particulate. Minimal amounts of the interfacial modifier can be used including about 0.005 to 8 wt.-%, or about 0.02 to 3 wt. %. Higher amounts are used to coat materials with increased morphology.

Magnetic Particles

The magnetic composites can be made of any magnetic particle material that when formed into a composite can be magnetized to obtain a permanent magnetic field. These particles are typically inorganic and can be ceramic. Magnetite is a mineral, one of the two common naturally occurring oxides of Iron (chemical formula $Fe_3O_4$) and a member of the spinel group. Magnetite is the most magnetic of all the naturally occurring minerals. Alnico magnet alloy is largely comprised of aluminum, iron, cobalt and nickel. Alnico is a moderately expensive magnet material because of the cobalt and nickel content. Alnico magnet alloy has a high maximum operating temperature and a very good corrosion resistance. Some grades of Alnico alloy can operate upwards of 5500° C. Samarium Cobalt (SmCo) and Neodymium Iron Boron (NdFeB) are called rare earth because Neodymium and Samarium are found in the rare earth elements on the periodic table. Both Samarium cobalt and neodymium magnet alloys are powdered metals which are compacted in the presence of a strong magnetic field and are then sintered. Ceramic magnet material (Ferrite) is strontium ferrite. Ceramic magnet material (Ferrite) is one of the most cost effective magnetic materials manufactured in industry. The low cost is due to the cheap, abundant, and non-strategic raw materials used in manufacturing this alloy. The permanent ceramic magnets made with this material lend themselves to large production runs. Ceramic magnet material (Ferrite) has a fair to good resistance to corrosion and it can operate in moderate heat.

Preferred magnetic particles are ferrite materials. Ferrite is a chemical compound consisting of a ceramic inorganic oxide material. Ferric oxide commonly represented as $FE_2O_3$ is a principal component. Preferred ferrite materials of the disclosure have at least some magnetic character and can be used as permanent magnet ferrite cores for transformers and as memory components in tape and disc and in other applications. Ferrite materials are ferromagnetic ceramic compounds generally derived from iron oxides. Iron oxide compounds are materials containing iron and oxygen atoms. Most iron oxides do not exactly conform to a specific molecular formula and can be represented as $Fe_2O_3$ or $Fe_3O_4$ as well as compounds as $Fe_xO_y$ wherein X is about 1 to 3 and Y is about 1 to 4. The variation in these numbers result from the fundamental nature of the ferric oxide material which invoke often does not have precisely defined ratios of iron to oxygen atoms. These materials are spinel ferrites and are often in the form of a cubic crystalline structure. The crystalline usually synthetic ceramic material typically is manufactured by manufacturing a ferric oxide material and at least one other metallic oxide material generally made from a metal oxide wherein the model is a divalent metal. Such metals include for example magnesium, calcium, barium, chrome manganese, nickel, copper, zinc, molybdenum and others. The preferred metals are magnesium, calcium and barium.

Preferred ferrites are typically prepared using ceramic techniques. Often the oxides are carbonates of the iron or divalent oxides are milled until a fine particulate is obtained. The fine particulate is dried and pre-fired in order to obtain the homogenous end product. The ferrite is then often heated to form the final spinel crystalline structure. Preparation of ferrites are detailed in U.S. Pat. Nos. 2,723,238 and 2,723,239. Ferrites are often used as magnetic cores in conductors and transformers. Microwave devices such as glycerin tubes can use magnetic materials. Ferrites can be used as information storage in the form of tape and disc and can be used in electromagnetic transistors and in simple magnet objects. One useful magnetic material is known as zinc ferrite and has the formula $Zn_xFe_{3-x}O_4$. Another useful ferrite is the barium ferrite that can be represented as $BaO:6Fe_2$ or $_2$ or $BaFe_{12}O_{19}$. Other ferrites includes soft ferrites such as manganese-zinc ferrite ($Mn_a Zn_{(1-a)}Fe_2O_4$) and nickel zinc ferrite $Ni_aZn_{(1-a)}Fe_2O_4$. Other useful ferrites are hard ferrites including strontium ferrite $SrFe_2O_4$, cobalt ferrite $CoFe_2O_4$.

In some greater detail, ferrites are typically produced by heating a mixture of finely divided metal oxide, carbonate or hydroxide with ferrite powder precursors when pressed into a mold. During the heating process the material is calcined. In calcination volatile materials are often driven off leaving the inorganic oxides in the appropriate crystal structure. When the divalent metal oxide material is produced from carbonate sources, during calcination, a mixture of oxide results from a heating or sintering of the blend driving off carbon dioxide leaving the divalent metal oxide. Such considering our high heating processes similar to the firing of ceramic materials generally.

We have further found that a blend of the magnetic particle and one, two, three or more particles in particulate form can obtain important composite properties from all of particulate materials in a polymer composite structure. For example, a tungsten composite or other high density metal particulate can be blended with a second metal particulate that provides to the relatively stable, non-toxic tungsten material, additional properties including a low degree of radiation in the form of alpha, beta or gamma particles, a low degree of desired cytotoxicity, a change in appearance or other beneficial properties. One advantage of a bimetallic composite is obtained by careful selection of proportions resulting in a tailored magnetic strength for a particular end use. Such composites each can have unique or special properties. These composite processes and materials have the unique capacity and property that the composite acts as an alloy a blended composite of two or three different metals inorganic minerals that could not, due to melting point and other processing difficulties, be made into an alloy form without the methods of the invention.

BRIEF DESCRIPTION OF THE DRAWINGS

FIG. 1 is a molded or extruded article made from the material of the invention. The FIGURE is an example of a structure that can be made using the various methods described herein.

DETAILED DESCRIPTION OF THE INVENTION

The invention relates to an improved magnetic particle and polymer composite material having enhanced or improved magnetic and physical properties with respect to prior art materials. Magnetic particle and polymer composites can be tailored for novel properties including magnetism, thermal conductivity, electrical conductivity, flexural properties, viscoelastic properties and other physical properties. The use of compositions further comprising a coating of an interfacial modifier demonstrates improved utilization of material properties and improved performance. Preferred composites can be combined with one or more polymers of a given molecular weight distribution, a magnetic particulate, and one or more particulates with a given distribution to obtain unique composites. The materials can be used in applications requiring magnetic strength that can be designed in and still obtain high-density, malleability, ductility, formability, flexure properties and viscoelastic properties. The invention specifically provides materials comprising a magnetic particulate, a polymer phase and, optionally, an interfacial modifier that permits the polymer and metal particulate to interact to form a composite with desired nature and degree of properties and to attain the maximum density possible. Such materials obtain physical properties in excess of prior art materials including storage modulus, color, magnetism, thermal conductivity, electrical conductivity and other physical property improvements without toxicity.

The composite materials of the invention combine a metal particulate at a maximum tap density leaving a excluded volume and a polymer material substantially occupying the excluded volume, but no more to obtain the highest possible density from the composite composition. Tap density (ASTM B527-93) relates to how well the material is packed. Packing affects the excluded volume and a volume component that is included in the density calculation. A variety of metal particulates in the correct size and distribution can be used. Further, the metal particle distribution has a substantial proportion of particulate falling in the range of 1 to 1000 microns, a substantial proportion of a particulate falling in the range of 1 to 5 microns, a substantial proportion of a particulate falling in the range of 1 to 10 microns, a substantial proportion of a particulate falling in the range of 1 to 100 microns, a substantial proportion of a particulate falling in the range of 1 to 250 microns or a substantial proportion of a particulate falling in the range of 1 to 500 microns. By a substantial proportion, we mean at least 10 wt.-% of the particulate. This distribution can be normal, Gaussian, log normal or skew normal but must include the desired range of particle sizes.

The tensile strength is 0.2 to 60 MPa and the storage modulus of the composite (G') ranges from about 1380 to about 14000 MPa, preferably from about 3450 to about 6000 MPa and a tensile modulus of at least 0.2 to 200 MPa. One important characteristic of the composite material of the invention relates to the existence of an elastic-plastic deformation and its Poisson ratio. The composite materials of the invention display an elastic plastic deformation. Under a stress that causes the composite to elongate, the structure deforms in an elastic mode until it reached a limit after which it deforms in a plastic mode until it reaches its limit and fails structurally. This property is shown as the at break in which the material elongates under stress by at least 5% or at least 10% before reaching an elastic limit and breaking under continued stress. The preferred material has a Poisson ratio typically less than 0.5 and preferably about 0.1 to about 0.5.

The regular, essentially spherical, character of the preferred particles of the invention can be defined by the circularity of the particle and by its aspect ratio. The aspect ratio of the particles should be less than 1:3 and often less than 1:1.5 and should reflect a substantially circular cross section or spherical particle. The circularity, or roughness of the particle can be measured by a microscopic inspection of the particles in which an automated or manual measurement of roughness can be calculated. In such a measurement, the perimeter of a representative selection of the particulate is selected and the area of the particle cross section is also measured. The circularity of the particle is calculated by the following formula:

Circularity=(perimeter)$^2$/area.

An ideal spherical particle has a circularity characteristic of about 12.6. This circularity characteristic is unitless parameter of less than about 20, often about 14 to 20 or 13 to 18.

Metal particulate that can be used in combination with magnetic particles in the composites of the invention include tungsten, iridium, platinum, rhenium, gold, neptunium, tantalum, iron, copper, nickel, cobalt, tin, bismuth and zinc. A variety of properties can be tailored through a careful selection of magnetic particles or a combination of magnetic particles and polymer and the toxicity or radioactivity of the materials can be designed into the materials as desired. Such particulates have a relatively low aspect ratio and are typically less than about 1:3 aspect ratio. An aspect ratio is typically defined as the ratio of the greatest dimension of the particulate divided by the smallest dimension of the particulate. Generally, spherical particulates are preferred, however, sufficient packing densities can be obtained from relatively uniform particles in a dense structure.

A large variety of polymer materials can be used in the composite materials of the invention. For the purpose of this application, a polymer is a general term covering either a thermoset or a thermoplastic. We have found that polymer materials useful in the invention include both condensation polymeric materials and addition or vinyl polymeric materials. Included are both vinyl and condensation polymers, and polymeric alloys thereof. Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water or some other simple, typically volatile substance. Such polymers can be formed in a process called polycondensation. The polymer has a density of at least 0.85 gm-cm$^{-3}$, however, polymers having a density of greater than 0.96 are useful to enhance overall product density. A density is often up to 1.7 or up to 2 gm-cm$^{-3}$ or can be about 1.5 to 1.95 gm-cm$^{-3}$ depending on metal particulate and end use.

Vinyl polymers include polyethylene, polypropylene, polybutylene, acrylonitrile-butadiene-styrene (ABS), polybutylene copolymers, polyacetyl resins, polyacrylic resins, homopolymers or copolymers comprising vinyl chloride, vinylidene chloride, fluorocarbon copolymers, etc. Condensation polymers include nylon, phenoxy resins, polyarylether such as polyphenylether, polyphenylsulfide materials; polycarbonate materials, chlorinated polyether resins, polyethersulfone resins, polyphenylene oxide resins, polysulfone resins, polyimide resins, thermoplastic urethane elastomers and many other resin materials.

Condensation polymers that can be used in the composite materials of the invention include polyamides, polyamide-imide polymers, polyarylsulfones, polycarbonate, polybutylene terephthalate, polybutylene naphthalate, polyetherimides, polyethersulfones, polyethylene terephthalate, thermoplastic polyimides, polyphenylene ether blends, polyphenylene sulfide, polysulfones, thermoplastic polyurethanes and others. Preferred condensation engineering polymers include polycarbonate materials, polyphenyleneoxide materials, and polyester materials including polyethylene terephthalate, polybutylene terephthalate, polyethylene naphthalate and polybutylene naphthalate materials.

Polycarbonate engineering polymers are high performance, amorphous engineering thermoplastics having high impact strength, clarity, heat resistance and dimensional stability. Polycarbonates are generally classified as a polyester or carbonic acid with organic hydroxy compounds. The most common polycarbonates are based on phenol A as a hydroxy compound copolymerized with carbonic acid. Materials are often made by the reaction of a bisphenol A with phosgene (O=CCl$_2$). Polycarbonates can be made with phthalate monomers introduced into the polymerization extruder to improve properties such as heat resistance, further trifunctional materials can also be used to increase melt strength or extrusion blow molded materials. Polycarbonates can often be used as a versatile blending material as a component with other commercial polymers in the manufacture of alloys. Polycarbonates can be combined with polyethylene terephthalate acrylonitrile-butadiene-styrene, styrene maleic anhydride and others. Preferred alloys comprise a styrene copolymer and a polycarbonate. Preferred polycarbonate materials should have a melt index between 0.5 and 7, preferably between 1 and 5 gms/10 min.

A variety of polyester condensation polymer materials including polyethylene terephthalate, polybutylene terephthalate, polyethylene naphthalate, polybutylene naphthalate, etc. can be useful in the composites of the invention. Polyethylene terephthalate and polybutylene terephthalate are high performance condensation polymer materials. Such polymers often made by a copolymerization between a diol (ethylene glycol, 1,4-butane diol) with dimethyl terephthalate. In the polymerization of the material, the polymerization mixture is heated to high temperature resulting in the transesterification reaction releasing methanol and resulting in the formation of the engineering plastic. Similarly, polyethylene naphthalate and polybutylene naphthalate materials can be made by copolymerizing as above using as an acid source, a naphthalene dicarboxylic acid. The naphthalate thermoplastics have a higher Tg and higher stability at high temperature compared to the terephthalate materials. However, all these polyester materials are useful in the composite materials of the invention. Such materials have a preferred molecular weight characterized by melt flow properties. Useful polyester materials have a viscosity at 265° C. of about 500-2000 cP, preferably about 800-1300 cP.

Polyphenylene oxide materials are engineering thermoplastics that are useful at temperature ranges as high as 330° C. Polyphenylene oxide has excellent mechanical properties, dimensional stability, and dielectric characteristics. Commonly, phenylene oxides are manufactured and sold as polymer alloys or blends when combined with other polymers or fiber. Polyphenylene oxide typically comprises a homopolymer of 2,6-dimethyl-1-phenol. The polymer commonly known as poly(oxy-(2,6-dimethyl-1,4-phenylene)). Polyphenylene is often used as an alloy or blend with a polyamide, typically nylon 6-6, alloys with polystyrene or high impact styrene and others. A preferred melt index (ASTM 1238) for the polyphenylene oxide material useful in the invention typically ranges from about 1 to 20, preferably about 5 to 10 gm/10 min. The melt viscosity is about 1000 cP at 265° C.

Another class of thermoplastic include styrenic copolymers. The term styrenic copolymer indicates that styrene is copolymerized with a second vinyl monomer resulting in a vinyl polymer. Such materials contain at least a 5 mol-% styrene and the balance being 1 or more other vinyl monomers. An important class of these materials are styrene acrylonitrile (SAN) polymers. SAN polymers are random amorphous linear copolymers produced by copolymerizing styrene acrylonitrile and optionally other monomers. Emulsion, suspension and continuous mass polymerization techniques have been used. SAN copolymers possess transparency, excellent thermal properties, good chemical resistance and hardness. These polymers are also characterized by their rigidity, dimensional stability and load bearing capability. Olefin modified SAN's (OSA polymer materials) and acrylic styrene acrylonitriles (ASA polymer materials) are known. These materials are somewhat softer than unmodified SAN's and are ductile, opaque, two phased terpolymers that have surprisingly improved weatherability.

ASA polymers are random amorphous terpolymers produced either by mass copolymerization or by graft copolymerization. In mass copolymerization, an acrylic monomer styrene and acrylonitrile are combined to form a heteric terpolymer. In an alternative preparation technique, styrene acrylonitrile oligomers and monomers can be grafted to an acrylic elastomer backbone. Such materials are characterized as outdoor weatherable and UV resistant products that provide excellent accommodation of color stability property retention and property stability with exterior exposure. These materials can also be blended or alloyed with a variety of other polymers including polyvinyl chloride, polycarbonate, polymethyl methacrylate and others. An important class of styrene copolymers includes the acrylonitrile-butadiene-styrene monomers. These polymers are very versatile family of engineering thermoplastics produced by copolymerizing the three monomers. Each monomer provides an important property to the final terpolymer material. The final material has excellent heat resistance, chemical resistance and surface hardness combined with processability, rigidity and strength. The polymers are also tough and impact resistant. The styrene copolymer family of polymers have a melt index that ranges from about 0.5 to 25, preferably about 0.5 to 20.

An important class of engineering polymers that can be used in the composites of the invention include acrylic polymers. Acrylics comprise a broad array of polymers and copolymers in which the major monomeric constituents are an ester acrylate or methacrylate. These polymers are often provided in the form of hard, clear sheet or pellets. Acrylic monomers polymerized by free radical processes initiated by typically peroxides, azo compounds or radiant energy. Commercial polymer formulations are often provided in which a variety of additives are modifiers used during the polymerization provide a specific set of properties for certain applications. Pellets made for polymer grade applications are typically made either in bulk (continuous solution polymerization), followed by extrusion and pelleting or continuously by polymerization in an extruder in which unconverted monomer is removed under reduced pressure and recovered for recycling. Acrylic plastics are commonly made by using methyl acrylate, methylmethacrylate, higher alkyl acrylates and other copolymerizable vinyl monomers. A preferred acrylic polymer material useful in the composites of the invention has a melt index of about 0.5 to 50, preferably about 1 to 30 gm/10 min.

Vinyl polymer polymers include a acrylonitrile; polymer of alpha-olefins such as ethylene, propylene, etc.; chlorinated monomers such as vinyl chloride, vinylidene dichloride, acrylate monomers such as acrylic acid, methylacrylate, methylmethacrylate, acrylamide, hydroxyethyl acrylate, and others; styrenic monomers such as styrene, alphamethyl styrene, vinyl toluene, etc.; vinyl acetate; and other commonly available ethylenically unsaturated monomer compositions.

Polymer blends or polymer alloys can be useful in manufacturing the pellet or linear extrudate of the invention. Such alloys typically comprise two miscible polymers blended to form a uniform composition. Scientific and commercial progress in the area of polymer blends has led to the realization that important physical property improvements can be made not by developing new polymer material but by forming miscible polymer blends or alloys. A polymer alloy at equilibrium comprises a mixture of two amorphous polymers existing as a single phase of intimately mixed segments of the two macro molecular components. Miscible amorphous polymers form glasses upon sufficient cooling and a homogeneous or miscible polymer blend exhibits a single, composition dependent glass transition temperature (Tg). Immiscible or non-alloyed blend of polymers typically displays two or more glass transition temperatures associated with immiscible polymer phases. In the simplest cases, the properties of polymer alloys reflect a composition weighted average of properties possessed by the components. In general, however, the property dependence on composition varies in a complex way with a particular property, the nature of the components (glassy, rubbery or semi-crystalline), the thermodynamic state of the blend, and its mechanical state whether molecules and phases are oriented.

The primary requirement for the substantially thermoplastic engineering polymer material is that it retains sufficient thermoplastic properties such as viscosity and stability, to permit melt blending with a metal particulate, permit formation of linear extrudate pellets, and to permit the composition material or pellet to be extruded or injection molded in a thermoplastic process forming the useful product. Engineering polymer and polymer alloys are available from a number of manufacturers including Dyneon LLC, B.F. Goodrich, G.E., Dow, and duPont.

Polyester polymers are manufactured by the reaction of a dibasic acid with a glycol. Dibasic acids used in polyester production include phthalic anhydride, isophthalic acid, maleic acid and adipic acid. The phthalic acid provides stiffness, hardness and temperature resistance; maleic acid provides vinyl saturation to accommodate free radical cure; and adipic acid provides flexibility and ductility to the cured polymer. Commonly used glycols are propylene glycol which reduces crystalline tendencies and improves solubility in styrene. Ethylene glycol and diethylene glycol reduce crystallization tendencies. The diacids and glycols are condensed eliminating water and are then dissolved in a vinyl monomer to a suitable viscosity. Vinyl monomers include styrene, vinyltoluene, paramethylstyrene, methylmethacrylate, and diallyl phthalate. The addition of a polymerization initiator, such as hydroquinone, tertiary butylcatechol or phenothiazine extends the shelf life of the uncured polyester polymer.

Polymers based on phthalic anhydride are termed orthophthalic polyesters and polymers based on isophthalic acid are termed isophthalic polyesters. The viscosity of the unsaturated polyester polymer can be tailored to an application. Low viscosity is important in the fabrication of fiber-reinforced composites to ensure good wetting and subsequent high adhesion of the reinforcing layer to the underlying substrate. Poor wetting can result in large losses of mechanical properties. Typically, polyesters are manufactured with a styrene concentration or other monomer concentration producing polymer having an uncured viscosity of 200-1,000 mPas (cP). Specialty polymers may have a viscosity that ranges from about 20 cP to 2,000 cP. Unsaturated polyester polymers are typically cured by free radical initiators commonly produced using peroxide materials. Wide varieties of peroxide initiators are available and are commonly used. The peroxide initiators thermally decompose forming free radical initiating species.

Phenolic polymers can also be used in the manufacture of the structural members of the invention. Phenolic polymers typically comprise a phenol-formaldehyde polymer. Such polymers are inherently fire resistant, heat resistant and are low in cost. Phenolic polymers are typically formulated by blending phenol and less than a stoichiometric amount of formaldehyde. These materials are condensed with an acid catalyst resulting in a thermoplastic intermediate polymer called NOVOLAK. These polymers are oligomeric species terminated by phenolic groups. In the presence of a curing agent and optional heat, the oligomeric species cure to form a very high molecular weight thermoset polymer. Curing agents for novalaks are typically aldehyde compounds or methylene ($-CH_2-$) donors. Aldehydic curing agents include paraformaldehyde, hexamethylenetetraamine, formaldehyde, propionaldehyde, glyoxal and hexamethylmethoxy melamine.

The fluoropolymers useful in this invention are perflourinated and partially fluorinated polymers made with monomers containing one or more atoms of fluorine, or copolymers of two or more of such monomers. Common examples of fluorinated monomers useful in these polymers or copolymers include tetrafluoroethylene (TFE), hexafluoropropylene (HFP), vinylidene fluoride (VDF), perfluoroalkylvinyl ethers such as perfluoro-(n-propyl-vinyl)ether (PPVE) or perfluoromethylvinylether (PMVE). Other copolymerizable olefinic monomers, including non-fluorinated monomers, may also be present.

Thermoplastics include polyvinylchloride, polyphenylene sulfite, acrylic homopolymers, maleic anhydride containing polymers, acrylic materials, vinyl acetate polymers, diene containing copolymers such as 1,3-butadiene, 1,4-pentadiene, halogen or chlorosulfonyl modified polymers or other polymers that can react with the composite systems of the invention. Condensation polymeric thermoplastics can be used including polyamides, polyesters, polycarbonates, polysulfones and similar polymer materials by reacting end groups with silanes having aminoalkyl, chloroalkyl, isocyanato or similar functional groups.

Particularly useful materials for the fluoropolymers are TFE-HFP-VDF terpolymers (melting temperature of about 100 to 260° C.; melt flow index at 265° C. under a 5 kg load is about 1-30 g-10 min$^{-1}$.), hexafluoropropylene-tetrafluoroethylene-ethylene (HTE) terpolymers (melting temperature about 150 to 280° C.; melt flow index at 297° C. under a 5 kg load of about 1-30 g-10 min$^{-1}$.), ethylene-tetrafluoroethylene (ETFE) copolymers (melting temperature about 250 to 275° C.; melt flow index at 297° C. under a 5 kg load of about 1-30 g-10 min$^{-1}$.), hexafluoropropylene-tetrafluoroethylene (FEP) copolymers (melting temperature about 250 to 275° C.; melt flow index at 372° C. under a 5 kg load of about 1-30 g-10 min$^{-1}$.), and tetrafluoroethylene-perfluoro(alkoxy alkane) (PFA) copolymers (melting temperature about 300 to 320° C.; melt flow index at 372° C. under a 5 kg load of about 1-30 g-10 min$^{-1}$.). Each of these fluoropolymers is commercially available from Dyneon LLC, Oakdale, Minn. The TFE-HFP-VDF terpolymers are sold under the designation "THV".

Also useful are vinylidene fluoride polymers primarily made up of monomers of vinylidene fluoride, including both homo polymers and copolymers. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, and any other monomer that readily copolymerizes with vinylidene fluoride. These materials are further described in U.S. Pat. No. 4,569,978 (Barber) incorporated herein by reference. Preferred copolymers are those composed of from at least about 70 and up to 99 mole percent vinylidene fluoride, and correspondingly from about 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 percent trifluoroethylene. Terpolymers of vinylidene fluoride, trifluoroethylene and tetrafluoroethylene such as described in U.S. Pat. No. 2,968,649 and terpolymers of vinylidene fluoride, trifluoroethylene and tetrafluoroethylene are also representative of the class of vinylidene fluoride copolymers which are useful in this invention. Such materials are commercially available under the KYNAR trademark from Arkema Group located in King of Prussia, Pa. or under the DYNEON trademark from Dyneon LLC of Oakdale, Minn. Fluorocarbon elastomer materials can also be used in the composite materials of the invention. Fluoropolymer contain $VF_2$ and HFP monomers and optionally TFE and have a density greater than 1.8 gm-cm$^{-3}$ fluoropolymers exhibit good resistance to most oils, chemicals, solvents, and halogenated hydrocarbons, and an excellent resistance to ozone, oxygen, and weathering. Their useful application temperature range is −40° C. to 300° C. Fluoroelastomer examples include those described in detail in Lentz, U.S. Pat. No. 4,257,699, as well as those described in Eddy et al., U.S. Pat. No. 5,017,432 and Ferguson et al., U.S. Pat. No. 5,061,965. The disclosures of each of these patents are totally incorporated herein by reference.

Latex fluoropolymers are available in the form of the polymers comprising the PFA, FEP, ETFE, HTE, THV and PVDF monomers. Fluorinated poly(meth)acrylates can generally be prepared by free radical polymerization either neat or in solvent, using radical initiators well known to those skilled in the art. Other monomers which can be copolymerized with these fluorinated (meth)acrylate monomers include alkyl(meth)acrylates, substituted alkyl(meth)acrylates, (meth)acrylic acid, (meth)acrylamides, styrenes, vinyl halides, and vinyl esters. The fluoropolymers can comprise polar constituents. Such polar groups or polar group containing monomers may be anionic, nonionic, cationic, or amphoteric. In general, the more commonly employed polar groups or polar group-containing organic radicals include organic acids, particularly carboxylic acid, sulfonic acid and phosphonic acid; carboxylate salts, sulfonates, phosphonates, phosphate esters, ammonium salts, amines, amides, alkyl amides, alkyl aryl amides, imides, sulfonamides, hydroxymethyl, thiols, esters, silanes, and polyoxyalkylenes, as well as other organic radicals such as alkylene or arylene substituted with one or more of such polar groups. The latex fluoropolymers described herein are typically aqueous dispersed solids but solvent materials can be used. The fluoropolymer can combined with various solvents to form emulsion, solution or dispersion in a liquid form. Dispersions of fluoropolymers can be prepared using conventional emulsion polymerization techniques, such as described in U.S. Pat. Nos. 4,418,186; 5,214,106; 5,639,838; 5,696,216 or *Modern Fluoropolymers*, Edited by John Scheirs, 1997 (particularly pp. 71-101 and 597-614) as well as assignees' copending patent application Ser. No. 01/031, 95, filed Jan. 31, 2001.

The liquid forms can be further diluted in order to deliver the desired concentration. Although aqueous emulsions, solutions, and dispersions are preferred, up to about 50% of a cosolvent such as methanol, isopropanol, or methyl perfluorobutyl ether may be added. Preferably, the aqueous emulsions, solutions, and dispersions comprise less than about 30% cosolvent, more preferably less than about 10% cosolvent, and most preferably the aqueous emulsions, solutions, and dispersions are substantially free of cosolvent.

Interfacial modifiers used in forming the coating on the particulate the non-reactive or non-crosslinking application fall into broad categories including, for example, stearic acid derivatives, typically non-reactive silane compounds, titanate compounds, zirconate compounds, aluminate compounds. Aluminates, phosphonates, titanates and zirconates useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen and sulfur. Preferably the titanates and zirconates contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand.

The choice of interfacial modifiers is dictated by metal particulate, polymer, and application. The particle surface is substantially continuously coated even if having substantial morphology. The coating isolates the particulate from the polymer from the particle. The maximum density of a composite is a function of the densities of the materials and the volume fractions of each. Higher density composites are achieved by maximizing the per unit volume of the materials with the highest densities. The materials are almost exclusively refractory metals such as tungsten or osmium. These materials are extremely hard and difficult to deform, usually resulting in brittle fracture. When compounded with deformable polymeric binders, these brittle materials may be formed into usable shapes using traditional thermoplastic equipment. However, the maximum densities achievable will be less then optimum. When forming composites with polymeric volumes approximately equal to the excluded volume of the filler, inter-particle interaction dominates the behavior of the material. Particles contact one another and the combination of interacting sharp edges, soft surfaces (resulting in gouging, points are usually work hardened) and the friction between the surfaces prevent further or optimal packing. Therefore, maximizing properties is a function of softness of surface, hardness of edges, point size of point (sharpness), surface friction force and pressure on the material, circularity, and the usual, shape size distribution. Because of this inter-particle friction the forming pressure will decrease exponentially with distance from the applied force. Interfacially modifying chemistries are capable of modifying the surface of the dense filler by coordination bonding, Van der Waals forces, covalent bonding, or a combination of all three. The surface of the particle behaves as a particle of the non-reacted end of the interfacial modifier. These organics reduce the friction between particles preventing gouging and allowing for greater freedom of movement between particles. These phenomena allow the applied shaping force to reach deeper into the form resulting in a more uniform pressure gradient.

Stearic acid compounds Preferred titanates and zirconates include isopropyl tri(dioctyl)pyrophosphato titanate (available from Kenrich Chemicals under the designation KR38S), Commercial organo titanates KR-238J and KR-9S, neopentyl (diallyl)oxy, tri(dodecyl)benzene-sulfonyl titanate (available from Kenrich Chemicals under the trademark and designation LICA 09), neopentyl(diallyl)oxy, trioctylphosphato titanate (available from Kenrich Chemicals under the trademark and designation LICA 12), neopentyl(diallyl)oxy, tri (dodecyl)benzene-sulfonyl zirconate (available from Kenrich Chemicals under the designation NZ 09), neopentyl(diallyl) oxy, tri(dioctyl)phosphato zirconate (available from Kenrich Chemicals under the designation NZ 12), and neopentyl(diallyl)oxy, tri(dioctyl)pyro-phosphato zirconate (available from Kenrich Chemicals under the designation NZ 38). The most preferred titanate is tri(dodecyl)benzene-sulfonyl titanate (available from Kenrich Chemicals under the designation LICA 09). The interfacial modifiers modify the particulate in the composites of the invention, by the formation of a layer on the surface of the metal particle reducing the intermolecular forces, improving the tendency of the polymer mix with the metal particle, and resulting in increased composite density.

The manufacture of the particulate and polymer composite materials depends on good manufacturing technique. Often the particulate is initially treated with an interfacial modifier by spraying the particulate with a 25 wt-% solution of the interfacial modifier on the particle with blending and drying carefully to ensure uniform particulate coating of the interfacial modifiers. Interfacial modifiers may also be added to particles in bulk blending operations using high intensity Littleford or Henschel blenders. Alternatively, twin cone mixers can be followed by drying or direct addition to a screw compounding device. Interfacial modifiers may also be combined with the metal particulate in aprotic solvent such as toluene, tetrahydrofuran, mineral spirits or other such known solvents.

The metal particulate can be interfacially combined into the polymer phase depending on the nature of the polymer phase, the filler, the particulate surface chemistry and any pigment process aid or additive present in the composite material. In general the mechanism used to blend particulate to polymer include solvation, chelation, coordination bonding (ligand formation), etc. Non-reactive coating of titanate, phosphonate or zirconate agents can be used. Such agents have the following formula:

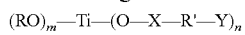

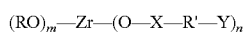

wherein m and n are 1 to 3. R and R' are independently a hydrocarbyl, $C_{1-12}$ alkyl group or a $C_{7-20}$ alkyl or alkaryl group wherein the alkyl or alkaryl groups may optionally contain one or more oxygen atoms or unsaturation; X is sulfate or phosphate; Y is H or any common substituent for alkyl or aryl groups; m and n are 1 to 3. Titanates provide antioxidant properties and can modify or control cure chemistry. Zirconate provides excellent bond strength but maximizes curing, reduces formation of off color in formulated thermoplastic materials. A useful zirconate material is neopentyl(diallyl)oxy-tri(dioctyl)phosphato-zirconate.

The composite materials having the desired physical properties can be manufactured as follows. In a preferred mode, the surface coating of the particulate with the interfacial modifier is initially prepared. The interfacial modifier is coated on the prepared particle material, and the resulting product is isolated and then combined with the continuous polymer phase to affect between the particulate and the polymer. In the composite, the coating of the interfacial modifier is less than 1 micron thick and isolates the polymer from the particle. The polymer does not "see" the coated particle allowing the coated particle to disperse throughout the polymer phase. Once the composite material is prepared, it is then formed into the desired shape of the end use material. Solution processing is an alternative that provides solvent recovery during materials processing. The materials can also be dry-blended without solvent. Blending systems such as ribbon blenders obtained from Drais Systems, high density drive blenders available from Littleford Brothers and Henschel are possible. Further melt blending using Banberry, single screw or twin screw compounders is also useful. When the materials are processed as a plastisol or organosol with solvent, liquid ingredients are generally charged to a processing unit first, followed by polymer polymer, particulate and rapid agitation. Once all materials are added a vacuum can be applied to remove residual air and solvent, and mixing is continued until the product is uniform and high in density.

Dry blending is generally preferred due to advantages in cost. However certain embodiments can be compositionally unstable due to differences in particle size. In dry blending processes, the composite can be made by first introducing the polymer, combining the polymer stabilizers, if necessary, at a temperature from about ambient to about 60° C. with the polymer, blending a particulate (modified if necessary) with the stabilized polymer, blending other process aids, interfacial modifier, colorants, indicators or lubricants followed by mixing in hot mix, transfer to storage, packaging or end use manufacture.

Interfacially modified materials can be made with solvent techniques that use an effective amount of solvent to initiate formation of a composite. When interfacially modification or interfacial treatment is substantially complete, the solvent can be stripped. Such solvent processes are conducted as follows:
1) Solvating the interfacial modifier or polymer or both;
2) Mixing the metal particulate into a bulk phase or polymer master batch: and
3) Devolatilizing the composition in the presence of heat vacuum above the Tg of the polymer When compounding with twin screw compounders or extruders, a preferred process can be used involving twin screw compounding as follows.
1. Add metal particulate and raise temperature to remove surface water (barrel 1).
2. Add interfacial modifier to twin screw when filler is at temperature (barrel 3).
3. Disperse/distribute/coat interfacial modifier on particulate.
4. Maintain temperature to completion.
5. Vent VOC (barrel 6).
6. Add polymer binder (barrel 7).
7. Compress/melt polymer binder.
8. Disperse/distribute polymer binder in particulate.
9. Blend modified particulate with polymer melt binder.
10. Vacuum degas remaining VOC (barrel 9).
11. Compress resulting composite.
12. Form desired shape, pellet, lineal, tube, injection mold article, etc. through a die or post-manufacturing step.
Alternatively in formulations containing small volumes of continuous phase:
1. Add polymer binder.
2. Add interfacial modifier to twin screw when polymer binder is at temperature.
3. Disperse/distribute interfacial modifier in polymer binder.
4. Add filler and disperse/distribute particulate.
5 Raise temperature to temperature.
6. Maintain temperature to completion.
7. Compress resulting composite.
8. Form desired shape, pellet, lineal, tube, injection mold article, etc. through a die or post-manufacturing step.

During the manufacture of the magnetic composites of the invention, the magnetic materials can be magnetized at virtually any point during processing, blending, extrusion and post-extrusion shaping as long as the composite is formed and held below the curie temperature (Tc). The most efficient magnetization step occurs after the shaped article is made since after that point, the particulates can be aligned such that the magnetic fields are maximized.

In general, magnetization is obtained by obtaining a strong magnetic field (obtained from either a strong permanent magnet or an electromagnet) and passing the magnetic composite material through the field for a sufficient period of time within the field to align the magnetic materials to form a permanent magnet. Typically magnetization occurs with the material at room temperature or at least below its curie temperature (Tc). Above the curie temperature, the magnetization will not have the desired full impact. In order to obtain full magnetization, the useful articles of the invention are commonly exposed to the magnetic field having field strength of at least 2000 Gauss for a period of time of at least 0.25 seconds or 4.00 seconds. In one embodiment, single objects can be magnetized in this way by transporting the objects on a conveyor belt through the magnetic field. In another embodiment of the invention, a strip of the composite can be magnetized by passing the strip, after extrusion then cooling or later after the material is stored, through the magnetic field at a rate such that the strip passes through the magnetic field at a rate of about 61.0 to about 305.0 centimeters per second or 122.0 to 244.0 centimeters per second with a magnetic field strength of at least 2000 Gauss. We have found that an enhanced magnetization can occur if the strip material is elongated after extrusion and cooled before or as it is magnetized. Accordingly the strip can be passed through a magnetization apparatus such that the strip is lengthened by at least 1%, 5%, 10%, 20% or more prior to passing the strip through the magnetic field. After magnetization, the strip can be relaxed and if substantially elastic, the elastic strip can rebound somewhat without losing magnetization. However a strip that is extended can retain its extension while maintaining its enhanced magnetic field property.

Post-magnetization process steps that tend to randomize the orientation of the particulates of the magnetic particles can tend to reduce overall magnetic field strength. Further heating the material to or above its curie temperature can also tend to reduce the magnetic properties of the material.

Certain selections of polymers and particulates may permit the omission of the interfacial modifiers and their related processing steps.

In addition to the aforementioned illustrative embodiments, additional processing methods are, but not limited to; molding, compression molding, thermoset and thermoplastic extrusion, centrifugal molding, rotational molding, blow molding, casting, calendaring, liquid fill thermoset molding or filament winding to form a variety of shapes in conjunction with sequential compounding. Yet another embodiment of the invention includes the magnetic composition of the resulting composites where a magnetic component is added for identification or as dictated by the end use requirements.

DETAILED DESCRIPTION OF THE FIGURE

FIG. 1 shows an embodiment of the magnetic material of the invention. The material of the invention is shown in the form of a core wrapped by an indeterminate length of the material. The coiled magnetic material 100 comprises a core 104 and an indeterminate length of the magnetic material 101. The magnetic material 101 has a coating 102 of a pressure sensitive adhesive that is maintained by release liner 103. The magnetic material has a width A, a thickness B and an indeterminate length C.

Methods and Procedures

Powder Characterizations:

Powder characterization is completed to determine packing behavior of the powdered materials. Packing fraction is determined by dividing the packing density of the powder by the true density as determined via helium pycnometry. Packing fraction is defined as:

$$P_f = P_d/d_{pync}$$

wherein $P_f$=packing fraction; $P_d$=packing density and $d_{pync}$=pyncnometer density.

Packing density is determined by measuring the bulk powder weight within a volume. The packing density is commonly determined by placing the powder within a metallurgical press. The press setup is available from Buehler International (Lake Bluff, Ill.). For frangible materials, pressure is reduced to the appropriate level to reduce breakage of the powder particles thereby preventing artificially high packing density values. For very frangible materials, a tap density is used. The pycnometer density is determined by helium gas pycnometry (AccuPync 1330 manufactured by Micromeretics Corporation—Norcross, Ga.).

Application of Interfacial Modifier:

To interfacially modify particles at a lab scale, the interfacial modifier is first solubilized with isopropyl alcohol (IPA). Then the procedures described in published application U.S. 2010/0280164, commonly owned by assignee, were followed to provide interfacially modified particles for the examples.

Compounding:

The polymer and modified particles are fed in appropriate ratios using K-tron K20 gravimetric weight loss feeders. The raw ingredients are fused together within a 19 mm B&P twin screw compounder. Barrel zone temperatures (5), screw speed, volumetric throughput, and die characteristics (number of openings and opening diameter) are varied depending on the nature of the particles and polymers being compounded. Commonly, torque, pressure, and melt temperature are monitored responses. A useful way to ensure the proper ratio of polymer and particulate(s) is to place compounded pellets into the heated metallurgical press; we call this the "puck density".

Extrusion:

The compounded products are extruded using 1" diameter extruder (Al-Be Industries, Fullerton, Calif.). Temperatures and volumetric throughput vary depending on the rheological behavior of the materials being extruded. Typically, motor amp load and extrusion pressures are monitored responses and used to gauge ease of extudability. For samples requiring characterization of tensile properties, the materials are extruded through a 19 mm×3 mm rectangular die plate onto a moving belt to minimize extrudate draw-down.

The composites of the invention can be used in a number of applications that use either the properties of the particulate in the composite or the overall viscoelastic properties of the composite. The viscoelastic materials can be formed into objects using conventional thermoplastic polymer forming techniques including extrusion, injection molding, compression molding, and others. The composites of the invention can be used in many specific applications such as in transportation (including automotive and aerospace applications), applications used to either attach materials to a magnetically receptive surface such as steel, or uses where magnetic properties are useful such as attachments or in mounting applications where a base or mounting attachment is needed. Specific applications include magnetic flexible tape, magnetic flexible tape with writeable surfaces, refrigerator magnets, fasteners, signage, displays, securing metal doors, attaching tools to machinery advertisements, attachments in containers, baggage, door seals, electronics, hanging artwork, window coverings, labeling, attaching seasonal decorations, bumper stickers, garments, or automotive or truck wheel weight.

The composites of the invention may further include a particulate and a polymer phase that combine to obtain in the composite valuable properties in addition to the magnetic properties. These properties include improved thermal properties (both heat sink and insulation character), improved impact resistance, improved hardness, improved frictional or abrasive character, improved barrier properties to the mass transfer of vapor or liquid materials through the composite, improved acoustic insulation properties. The composites obtain these properties from a selection of the particulate and polymer and a selection of particulate loading.

Polymer composite comprises about 30 to 87 vol % of a ceramic particulate having a particle size $P_S$ greater than about 1.0 microns, having a coating of about 1 to about 0.005 to 5 wt-% of an interfacial modifier, the percentage based on the composite; and a polymer phase. The particle of the composite comprises a particle size $P_S$ of about 1.0 to 400 microns, IM can be used at about 0.01 to 3 wt-%, about 15 to 350 microns or greater than about 10 microns with a circularity of the mineral about 12.5 to 50. In one embodiment particle comprises a ferrite having a particle size $P_S$ of about 1 to 500 microns.

The composite has 0.02 to 1.8 wt-% of an interfacial modifier; and a polymer phase. In certain aspects the composite can have a tensile strength of about 0.1 to 15 times or about 5 to 25 times that of the base polymer. The composite has a tensile strength of 5 and 100 times that of the base polymer. Similarly in certain applications the composite can have a tensile elongation of about 5% to 100%, about 8% to 100% or a tensile elongation of about 10% and 100% of the base polymer.

The composite has combination of a tensile strength of about 10 to 20 times that of the base polymer and a tensile elongation of about 15% and 100% of base polymer and the composite has a thermoplastic shear of at least 5 sec$^{-1}$, at least 10 sec$^{-1}$, at least 20 sec$^{-1}$, at least 50 sec$^{-1}$ etc. In another embodiment, the composite has a tensile strength of at least 0.2 MPa and a thermoplastic shear of at least 25 sec$^{-1}$. The composite comprises greater than 30 vol.-% or 50 vol.-% of the inorganic mineral. In the composite, the composite comprises a particulate wherein the majority of the particulates having a particulate size $P_s$ of about 1 to 1000 μm (microns) or 1 to 500 microns and a fluoropolymer or a polyvinyl chloride phase. In certain applications the particle size distribution can fall within 1 to 150 microns. The composite can comprise a mixed particulate wherein the ceramic composite has a particle size $P_s$ of about 1 to 200 microns and the composite additionally comprises a second particulate with a particle size $P_S^1$ that differs from the inorganic composite by at least 5 microns, alternatively, the particle size $P_S$ according to the formula $P_s \leq 2 P_S^1$ or $P_S \geq 0.5 P_S^1$; wherein $P_S$ is the particle size of the inorganic mineral and $P_S^1$ is the particle size of the second particulate. The next particulate can comprise, in addition to the ferrite or ceramic particle, a variety of particulate including metallic, nonmetallic, hollow glass series, solid glass spheres, inorganic minerals, etc. and mixtures thereof. The composite wherein the particle comprises a ceramic having a particle size ($P_s$) of greater than about 10 microns, a circularity of the ceramic particle is 12.5 to 50, 14 to 50, 18 to 45 or 20 to 45. The second particulate comprises a ceramic particulate, a glass microsphere, a solid glass sphere, or a second inorganic composite, circularity of greater than 14 and a density less than 0.9 gm-cm$^{-3}$, or a hollow glass sphere having a particle size $P_S$ of about 10 to 300 microns, a solid glass sphere having a particle size $P_S$ of about 5 to 300 microns, a silica having a particle size $P_S$ of about 5 to 300 microns, a silica or silica sand having a particle size $P_S$ of about 75 to 300 microns. The silica particle can comprise a zirconium silicate. The polymer can comprise a fluoropolymer, a fluoro-elastomer, a polyamide, a nylon, a poly(ethylene-co-vinyl acetate), a synthetic rubber, a polyvinyl chloride, a polyolefin (including a high density polyolefin) such as a polyethylene (including a HDPE) a polypropylene or other such polymers or mixtures. The particles can have a coating of about 0.01 to 3 wt % of an interfacial modifier based on the composite. The particles have an excluded vol. of about 13 vol.-% to about 70 vol.-%, or about 13 vol.-% to about 60 vol.-%. The composite can contain an organic or inorganic pigment, or an organic fluorescent dye.

A preferred particulate polymer composite comprises a ferrite in a polymer phase, the composite comprising about 90 to 40 vol.-% of a ferrite particle, having a density greater than 0.10 gm-cm$^{-3}$ and less than 5 gm-cm$^{-3}$, a particle size $P_S$ greater than 5 microns, a circularity greater than 12.5, 14 or 20 and an aspect ratio less than 9 or 3; and about 10 to 70 vol.-% of a polymer phase. The particulate comprises a layer; wherein the particle has an IM coating about 0.01 to 1 micron or 0.02 to 0.8 micron thick comprising about 0.005 to 8 wt.-% of an interfacial modifier. The composite density is about 0.9 to 15 gm-cm$^{-3}$, about 0.4 to 5 gm-cm$^{-3}$ or about 0.9 to 10 gm-cm$^{-3}$, about 1 to 8 gm-cm$^{-3}$ or about 1.5 to 6 gm-cm$^{-3}$.

A shaped article can be made comprising the composite having about 87 to 48 vol.-% of a particulate having a particle size $P_S$ greater than 10 microns, and having a particle size $P_S$ distribution having at least 10 wt.-% of a particulate within about 10 to 100 microns, at least 10 wt.-% of the polymer particulate within about 10 to 500 microns, a circularity greater than 13 and an aspect ratio less than 1:3; about 13 to 51 vol.-% of a polymer phase.

Preferred articles include any magnet shape for positioning a useful device or informational legend or design in an appropriate location. Such location provides efficient use of the devise or conspicuous position for an informational legend or design.

Another embodiment is a magnetic tape composite.

| Tape Characteristics | | | |
|---|---|---|---|
| Aspect | | | |
| Thickness | 0.01-10 mm | 0.02-5 mm | 0.03-3 mm |
| Width | 0.5-30 cm | 1-10 | 2-5 cm |
| Length | Indeterminate or as needed | greater than 1 m | Greater than 5 m |

| Tape Characteristics | | | |
|---|---|---|---|
| Aspect | | | |
| Magnetic Peel (90°) Lbf/ft | 0.5-50 | 1-30 | 2-20 |
| Flexibility[1] | Pass | Pass | Pass |
| Flexibility[2] | Pass | Pass | Pass |

[1] = 0.062 in. (1.57 mm) thick-Bend @ 1.0 to 4.0__ cm/sec (hand tested). around 1/16 in. (1.59 mm) diameter mandrel
[2] = 0.062 in. (1.57 mm) thick-Bend @ 1.0 to 4.0__ cm/sec (hand tested). around 1/4 in. (1.59 mm) diameter mandrel at 113° F. - 28 days A method of forming an inorganic and polymer composite material can be used wherein the extrudable mass comprises a polymer phase and a particle phase, the particle phase comprising a coating of an interfacial modifier in an amount of about 0.005 to 8 wt.-% of an interfacial modifier or of about 0.01 to 3 wt. % of an interfacial modifier based on the composite, the particles comprising a first particle particulate having a circularity of greater than about 15 or 10 and a second substantially round particulate having a circularity of about 12.5 to 15; the second particulate comprising greater than 5 vol.-% of the composite wherein upon extrusion, the shear on the extrudable mass, the wear of an extruder and the extrusion pressure is reduced. In the method, the second substantially round particle is used at about 13 to 75 vol.-% of a particulate phase comprising 13 to 87 vol.-% of the composite. Lastly, the particle size $P_S$ of the first particle differs from the second round particle size $P_S$ of the second particle by about 5 microns or the particle sizes differ such that the first particle size is greater than twice the size or half the size of the second round particle. The presence of the second round particle reduces wear, reduces pressure and reduces shear imposed on the extrudable mass comprising the polymer and particulate. Any improvement in the process ability improves extruder lifetime and product quality.

In summary, the composites, as dictated by the specific claims contained herein, represents a breadth of raw material combinations including; ferrites, metals, inorganic particles, ceramic particles, glass bubble particles, polymers, interfacial modifiers, other additives, all with varying particle sizes, weight fractions, and volume fractions. The present invention also includes a breadth of processing methods, resulting physical and chemical properties, and end-use applications. The following materials exemplify the invention. The materials can all be formed, molded, extruded or otherwise made into useful composites and shapes.

EXPERIMENTAL

Example 1 and Examples 2a-2e

Ferrite Particles

Strontium Ferrite particles ($SrFe_{12}O_{19}$_SFP), HM401, were obtained from Hoosier Magnetics Inc., (Ogdensburg, N.Y.). The particle size of SFP is 2.0 to 2.6 microns as measured by FSSS. These SFP were prepared, with the following modifications, using the methods and procedures described supra to prepare interfacially modified (IM) coated particles.

Before compounding or coating, the pycnometer and press densities were measured to calculate the packing fraction of SFP. The helium pycnometer density was found to be 2.65 g/cc. The SFP was pressed to a load of 10000 lbf ram pressure (8200 psi) and pumped and released 30 times.

SFP were coated with 2.5 pph, based on particle, of isopropyl triisostearoyl titanate (Kenrich Petrochemicals, Bayonne, N.J.) relative to. The IM coated SFP were compounded into a fluoropolymer, Dyneon THV 221, from 3M Dyneon™ (Oakdale, Minn.) or polyvinyl chloride, A7000 Trans 9423, (PVC) from PolyOne (Avon Lake, Ohio) to form the composite pellets.

The coated SFP were analyzed to determine the coated density which was found to range from approximately 4.5 to 5.0 g/cc for PVC. The target packing in the composite was set at 63 vol % SFP based on the composite. The 63 vol % particle was maintained for the coated materials with the understanding that the IM is a part of the continuous polymer phase not the particle phase.

Both coated materials were compounded using a 19 mm screw extruder using the temperature profiles as listed in the table zones and a 5 hole die. Both materials were fed into the compounder with KTron gravimetric screw feeders. Both materials were cut into pellets at the die face. The materials were then extruded as shown below.

Four ASTM 638 type four dog bones were cut from the extruded strips of each material. Each sample was tested with a constant extension rate of one inch (25.4 mm) per minute and the force required was recorded. Table 1 summarizes the tensile properties and composition of the materials created in this experiment.

TABLE 1

|  | Adhesive backed Magnetic strip | Writeable Magnet | | | | |
|---|---|---|---|---|---|---|
|  |  | 2a | 2b | 2c | 2d | 2e |
| POLYMER | | | | | | |
| Type | Fluoropolymer | PVC | PVC | PVC | PVC | PVC |
| Volume Fraction | 29.03% | 36.64% | 33.38% | 30.13% | 27.96% | 30.85% |
| Weight Fraction | 13.34% (Calculated) | 11.74% | 10.73% | 9.71% | 9.02% | 9.93% |
| PARTICLE | | | | | | |
| Untreated Volume Fraction |  | 63.00% | 63.00% | 63.00% | 63.00% | 63.00% |
| Treated Volume Fraction | 70.97% (Calculated) | 63.36% | 66.62% | 69.87% | 72.04% | 69.15% |
| Untreated Weight Fraction |  | 88.17% | 88.39% | 88.61% | 88.76% | 88.56% |
| Treated Weight Fraction | 86.66% (Calculated) | 88.26% | 89.27% | 90.29% | 90.98% | 90.07% |
| Type | IM | IM composite blend | IM composite blend | IM composite blend | IM composite blend | IM composite blend |
| pph Loading Level | 2.5 | 0.1 | 1 | 1.9 | 2.5 | 1.7 |
| pycnometer density (g/cc) |  | 5.0534 | 4.8713 | 4.7153 | 4.5676 | 4.7185 |
| COMPOUNDING | | | | | | |
| Volumetric Throughput (cc/min) |  | 27 | 27 | 27 | 27 | 27 |
| Polymer Mass Flow (g/min) |  | 11.57 | 10.55 | 9.52 | 8.83 | 9.75 |
| Particle Mass Flow (g/min) |  | 86.97 | 87.76 | 88.54 | 89.06 | 88.36 |
| Zone Temps (in-->out) Celsius |  | 165-165-165-165 | 165-165-165-165 | 155-155-155-155 | 155-155-155-155 | 155-155-155-155 |
| Screw Description |  | aggressive nonreversing | aggressive nonreversing | aggressive nonreversing | aggressive nonreversing | aggressive nonreversing |
| Screw Speed (RPM) |  | 160 | 160 | 160 | 160 | 160 |
| Die Plate Used |  | 5 hole | 5 hole | 5 hole | 5 hole | 5 hole |
| Pressure (psig) |  | 210 | 125 | 0 | 0 | 70 |
| Torque Range (%) |  | 40 | 20 | 20 | 15 | 18 |
| PROPERTIES | | | | | | |
| Target Puck Density (g/cc) |  | 3.65 | 3.64 | 3.63 | 3.63 | 3.63 |
| Actual Puck Density (g/cc) |  | 3.67 | 3.72 | 3.67 | 3.62 | 3.68 |
| T&E Initial Peak Observed? |  | Y (lg) | Y (lg) | Y | Y (sm) | Y |
| Stress @ Yield (MegaPa) | 0.48 | 5.0 | 2.0 | 1.8 | 1.0 | 1.9 |
| Stress @ Break (MegaPa) | 1.37 | 5.0 | 2.0 | 1.0 | 1.0 | 1.2 |
| Strain @ Break (inches) | 6.06 | 0.1 | 0.2 | 3.2 | 3.0 | 3.0 |

TABLE 1-continued

|  | Adhesive backed Magnetic strip | Writeable Magnet | | | | |
| --- | --- | --- | --- | --- | --- | --- |
|  |  | 2a | 2b | 2c | 2d | 2e |
| MAG TAPE | | | | | | |
| Poles per inch | 16 | 16 | 16 | 16 | 16 | 16 |
| Magnetic Strength lbs/ft | 10.5 | NA | 9.72 | 9.36 | 9.72 | NA |
| Magnetic Strength GAUSS | 380 | NA | 345 | 337 | 343 | NA |

As the IM loading for the PVC sample rises, the torque range and pressure decreases during composite pellet formation. This lowering of the torque range and pressure are indicators of the viscoelastic properties of the composite. Similar properties are seen in the Stress @ yield, Stress @ Break and Strain @ Break property characteristics for the magnetic composite. Such viscoelastic properties are due, in part, to the immiscibility of the IM coated SFPs in the polymer phase. Such properties are not seen in a material that has a distribution of either an uncoated particle or a coupled particle in a polymer phase.

To make magnetic strips or tape, SFP composite pellets were fed into extruder to make magnetic tape. The extruder operated at the parameters listed in the table. The extruded strip had the following parameters 1.0 inch (25.4 mm) by 0.060 inch (1.524 mm) thick and an indeterminate length. For the magnetic strip with an adhesive backing adhesive tape, from 3M, was applied to one face of the extruded strip. A capstock of white PVC, from PolyOne was laminated to one face of the writeable magnetic.

The SFP strip was magnetized using neodynium ring magnet rollers from FLEXMAG Arnold Magnetic Technologies, Inc. (Marengo, Ill.). The strip was pulled across 2 rollers of the ring magnets. During the magnetization process the speed of the tape across the rollers was 6-10 feet per minute, and the rollers were separated by 6 inches (152.4 mm). For ½ inch (12.7 mm) tape profiles, two rollers were used for the magnetization process. For 1.0 inch (25.4 mm) profiles, four rollers were used. Other combinations of rollers for magnetization are contemplated depending on the shaped article being fabricated.

The final magnetic characteristics of the tape or strip was a 16 poles per inch with a holding strength of approximately 10.5 lbs/ft. Magnetic poles per inch (ppi) may vary from 4 to 20 ppis. More ppi increase the holding strength, less ppi increases the distance at which the magnet attracts but decreases the holding strength. For embodiments of the invention may be 12, 13, 14, 16, 17, 18, or at least 20 ppi depending on the application. Ppi is also a function of thickness with thicker substrates having fewer ppi.

The dimensions of the adhesive-backed tape were 1.0 inch (25.4 mm) by 0.60 inch (1.524 mm) and the dimensions of the writeable magnetic tape were 1.0 inch (25.4 mm) by 0.060 inch (1.524 mm). The tape is flexible so that it can be wound and delivered as a spool. Other dimensions such as about 0.5, 0.750, 1.0, 1.5, 2.0, or 3.0 inches width, which is equivalent to 6.35, 12.7, 19.0, 25.4, 38.1, or 50.8 mm in width, are also made with thicknesses of such as 0.050, 0.060, 0.072, 0.075, 0.080, or 0.100 inches, which is equivalent to 1.27, 1.524, 1.829, 1.905, 50.8, 2.032, or 2.54 mm in width, Thicknesses may be adjusted for application.

The final magnetic characteristics of the tape or strip was a 16 poles per inch with a holding strength of ranging from 9.36 to 10.5 lbs/ft. The tape is flexible so that it may be wound and delivered as a spool.

The optional adhesive strip may be affixed to the surface of the magnetic strip to facilitate holding non-magnetic material such as paper. Further, the magnetic strip may have a non-magnetic cap of a polymer, such as PVC, with a writeable surface. This writeable surface, or capstock, may be in any color. In embodiments of the invention, writeable surfaces may be of either grey or white capstock, such as 85857 Rigid White or Flex Gray A7000 available from PolyOne. This material is coextruded onto one surface of the tape to provide a writing surface.

Other magnetic materials may be used to make magnetic tape as well. Barium Ferrite, Magnetite, or ALINCO alloy particles are supplied as particles. These particles are incorporated into polymer such as the PVC or THV as previously described, or incorporated into other polymer phases such as, for example, various synthetic rubbers like butadiene, styrene butadiene, isoprene, chloroprene, isobutylene and the like. The steps to form the composite and the tape are similar to the description already provided. Modifications to the composite processing and extrusion methods are made if required by specific polymer or particle characteristics.

The optional adhesive strip may be affixed to the surface of the magnetic strip to facilitate holding non-magnetic material such as paper. Further, the magnetic strip may have a non-magnetic cap of a polymer, such as PVC, with a writeable surface.

It is noted that as the IM loading for the PVC sample rises, the torque range and pressure decreases during composite pellet formation. This lowering of the torque range and pressure are indicators of the viscoelastic properties of the composite. Such viscoelastic properties are due, in part, to the immiscibility of the IM coated SFPs in the polymer phase and such properties are not seen in uncoated or coupled particles mixed into a polymer phase.

While the above specification shows an enabling disclosure of the magnetic composite technology of the invention, other embodiments of the invention may be made without departing from the spirit and scope of the invention. Accordingly, the invention is embodied in the claims hereinafter appended.

What is claimed is:

1. A magnetic particle and polymer viscoelastic composite comprising:
 (a) a magnetic particle consisting of a ferrite having an exterior coating of about 0.005 to 8 wt. %, based on the composite, of an interfacial modifier, the magnetic particle having a particle size greater than about 1 micron, a particle size distribution such that there are greater than about 5 wt. % of magnetic particles in the range of 1 to 1000 microns to form the composite; and (b) a thermoplastic polymer phase;

wherein the viscoelastic composite has a tensile elongation of about at least 5%.

2. The composite of claim 1 wherein the viscoelastic composite has a tensile elongation of at least 30%.

3. The viscoelastic composite of claim 1 wherein the composite has a tensile strength of at least 0.2 MPa and a thermoplastic shear of at least 5 sec$^{-1}$.

4. The composite of claim 1 wherein the ferrite is a barium ferrite particle.

5. The composite of claim 4 wherein the particle contains about at least 5 wt.-% of a particle size in the range of about 1 to 1000 microns.

6. The composite of claim 1 wherein the thermoplastic polymer comprises a fluoropolymer or a polyvinyl chloride.

7. The composite of claim 1 wherein the composite comprises about 0.02 to 3 wt % of an interfacial modifier.

8. The composite of claim 1 wherein the magnetic particle in the composite has an excluded volume of about 13 vol.-% to about 61 vol.-%.

9. The composite of claim 1 wherein the ferrite is a strontium ferrite, a calcium ferrite, a barium strontium ferrite, a cobalt ferrite, a zinc ferrite, magnetite, or blends thereof.

10. A magnetic particle and vinyl polymer composite comprising:

(a) a magnetic particle consisting of a ferrite having an exterior coating of about 0.005 to 8 wt. %, based on the composite of an interfacial modifier, the particle having a particle size greater than about 1 micron, a particle size distribution such that there are greater than about 5wt. % of magnetic particles in the range of 1 to 1000 microns; and (b) a vinyl polymer phase;

wherein the viscoelastic composite has a tensile elongation of about at least 5%.

11. The composite of claim 10 wherein the viscoelastic composite has a tensile elongation of at least 30%.

12. The viscoelastic composite of claim 10 wherein the composite has a tensile strength of at least 0.2 MPa and thermoplastic shear of at least 5 sec$^{-1}$.

13. The composite of claim 10 wherein the composite contains about at least 5 wt.-% of particles in the range of about 1 to 100 microns.

14. The composite of claim 13 wherein the particles contain about at least 5 wt.-% of a particle size in the range of about 100 to 250 microns.

15. The composite of claim 10 wherein the composite comprises about 0.02 to 3 wt % of an interfacial modifier.

16. The composite of claim 10 wherein the magnetic particle in the composite has an excluded volume of about 13 % to about 61%.

17. The composite of claim 10 wherein the ferrite is a strontium ferrite, a barium ferrite, a calcium ferrite, a barium strontium ferrite, a cobalt ferrite, a zinc ferrite, magnetite, or blends thereof.

18. A magnetic particle-polymer composite comprising a magnetic particle consisting of a ferrite having an exterior coating of about 0.005 to 8 wt. % of an interfacial modifier, the particle having a range of particle sizes such that about at least 5 wt.-% of particles are in the range of about 1 to 250 microns, and a polymer, the composite having a van der Waals' dispersion bond strength between molecules in adjacent particles of less than about 4 kJ-mol$^{-1}$ and a bond dimension of 1.4 to 1.9 Å.

19. The composite of claim 18 wherein the van der Waals' dispersion bond strength between molecules in adjacent particles of less than about 2 kJ-mol$^{-1}$ and the van der Waals' bond dimension is about 1.5 to 1.8 Å.

20. A shaped magnetic article comprising an object magnetized by exposure to a magnetic field; wherein in the article comprises about 90 to 50 volume-% of a magnetic particle consisting of a ferrite having an exterior coating of about 0.005 to 8 wt. % of an interfacial modifier, the particle having a particle size greater than 1 microns, the magnetic particles having a particle size distribution such that at least 10 wt.-% of the polymer particles are within about 1 to 500 microns, a circularity greater than 13 and an aspect ratio less than 1:3 and about 10 to 50 volume-% of a polymer phase.

21. The article of claim 20 wherein the article has an elongation at break of about 5 to 500%.

22. The article of claim 20 comprising a composite having a storage modulus of 1380 to about 14000 MPa and an extrusion shear rate of 10 to 250 sec$^{-1}$ at 180° C.

23. A shaped magnet article comprising an object magnetized by exposure to a magnetic field, the article comprising about 87 to 48 volume-% of a magnetic particle, the particle consisting of a ferrite having an exterior coating of about 0.005 to 8 wt. % of an interfacial modifier, the particle having a particle size greater than 10 microns, the magnetic particles having a particle size distribution having at least 10 wt.-% of a particles within about 10 to 100 microns, a circularity greater than 13 and an aspect ratio less than 1:3; about 13 to 61 volume-% of a polymer phase.

24. The article of claim 23 in the form of an elongated planar structure of an indeterminate length and an adhesive layer.

25. The article of claim 23 comprising composite having a storage modulus of 1380 to about 14000 MPa and an extrusion shear rate of 10 to 500 sec$^{-1}$ at 220° C.

26. The article of claim 23 wherein the composite is in the form of a planar structure with an adhesive coating layer.

\* \* \* \* \*